US012214228B2

(12) United States Patent
VanDerWoude et al.

(10) Patent No.: US 12,214,228 B2
(45) **Date of Patent: *Feb. 4, 2025**

(54) PERSONAL PROTECTION SYSTEM

(71) Applicant: Stryker Corporation, Kalamazoo, MI (US)

(72) Inventors: Brian VanDerWoude, Portage, MI (US); Michael W. Noonan, Portage, MI (US); Richard F. Huyser, Kalamazoo, MI (US); Bruce Henniges, Galesburg, MI (US)

(73) Assignee: Stryker Corporation, Portage, MI (US)

( * ) Notice: Subject to any disclaimer, the term of this patent is extended or adjusted under 35 U.S.C. 154(b) by 738 days.

This patent is subject to a terminal disclaimer.

(21) Appl. No.: 17/399,335

(22) Filed: Aug. 11, 2021

(65) Prior Publication Data

US 2021/0370104 A1 Dec. 2, 2021

Related U.S. Application Data

(63) Continuation of application No. 16/568,957, filed on Sep. 12, 2019, now Pat. No. 11,090,516, which is a (Continued)

(51) Int. Cl.

*A62B 18/00* (2006.01)
*A42B 3/28* (2006.01)

(Continued)

(52) U.S. Cl.

CPC ............ *A62B 18/003* (2013.01); *A42B 3/286* (2013.01); *A62B 7/00* (2013.01); *A62B 17/04* (2013.01);

(Continued)

(58) Field of Classification Search

CPC ....... A42B 3/044; A42B 3/286; A42B 3/0406; A42B 3/20; A42B 3/225;

(Continued)

(56) References Cited

U.S. PATENT DOCUMENTS 2,108,256 A * 2/1938 Dym ...................... A62B 18/00 128/201.15
2,365,656 A 12/1944 Lamsa (Continued)

FOREIGN PATENT DOCUMENTS

JP S50136989 A 10/1975
JP 2005087429 A 4/2005

(Continued)

OTHER PUBLICATIONS

English translation for KR 100933465, machined transalted by Espacenet.com.*

(Continued)

*Primary Examiner* — Tu A Vo
(74) *Attorney, Agent, or Firm* — Howard & Howard Attorneys PLLC

(57) ABSTRACT

A personal protection system including a helmet worn on the head of a user and a hood removably coupled to the helmet. The hood may include a shell, a transparent face shield, and a mounting element configured to removably couple the hood to the helmet. The transparent face shield may include a first lens and a second lens. The first lens may be coupled to the shell, and the second lens may be coupled to the first lens. The second lens may be coupled to the first lens by one of an adhesive, heat staking or ultra-sonic welding. The hood may also include a mounting element configured to center the transparent face shield relative to a light assembly coupled to the helmet such that the light emitted from the light assembly passes through a u-shaped opening or slot defined by the second lens.

20 Claims, 20 Drawing Sheets

Related U.S. Application Data continuation of application No. 14/850,525, filed on Sep. 10, 2015, now Pat. No. 10,449,397, which is a continuation of application No. PCT/US2014/025919, filed on Mar. 13, 2014.

(60) Provisional application No. 61/783,234, filed on Mar. 14, 2013.

(51) Int. Cl.

| | |
|---|---|
| ***A62B 7/00*** | (2006.01) |
| ***A62B 17/04*** | (2006.01) |
| ***A62B 18/04*** | (2006.01) |
| ***A62B 18/08*** | (2006.01) |

(52) U.S. Cl.
CPC ............ *A62B 18/04* (2013.01); *A62B 18/045* (2013.01); *A62B 18/082* (2013.01); *A62B 18/084* (2013.01)

(58) Field of Classification Search
CPC ... A42B 3/28–288; A62B 18/003; A62B 7/00; A62B 17/04; A62B 18/04; A62B 18/045; A62B 18/082; A62B 18/084; A62B 18/00–10; A61F 9/068; A41D 13/1153; A41D 13/1184; A41D 13/11–1227
See application file for complete search history.

(56) References Cited

U.S. PATENT DOCUMENTS 2,800,901 A * 7/1957 Monro .................. A62B 17/04 2/202
2,860,632 A * 11/1958 Conti .................... A62B 17/04 D24/110.2
3,943,575 A 3/1976 Bolker
3,955,570 A 5/1976 Hutter, III
4,901,716 A * 2/1990 Stackhouse .............. A42C 5/04 128/201.28
5,054,480 A * 10/1991 Bare .................... A62B 18/045 128/206.28
5,109,549 A 5/1992 Mattinson
5,711,033 A * 1/1998 Green ..................... F04D 17/16 2/424
5,881,389 A 3/1999 Fruge
6,158,429 A 12/2000 Gardner et al.
6,370,695 B2 4/2002 Paris et al.
6,393,617 B1 * 5/2002 Paris ...................... A62B 17/04 2/171.3
6,775,850 B1 8/2004 Grilliot et al.
6,990,691 B2 1/2006 Klotz et al.
7,275,535 B1 10/2007 Brockman
7,658,891 B1 2/2010 Barnes
7,735,156 B2 6/2010 VanDerWoude et al.
7,752,682 B2 7/2010 VanDerWoude et al.
7,937,775 B2 5/2011 Manzella, Jr. et al.
8,225,428 B2 7/2012 Grilliot et al.
8,234,722 B2 8/2012 VanDerWoude et al.
8,282,234 B2 10/2012 VanDerWoude et al.
8,302,599 B2 11/2012 Green
8,707,472 B2 4/2014 Stachler et al.
8,899,774 B2 12/2014 Strong et al.
8,960,190 B2 2/2015 James et al.
9,400,101 B2 7/2016 Strong et al.
10,253,964 B2 4/2019 Strong et al.
10,449,397 B2 10/2019 VanDerWoude et al.
10,830,428 B2 11/2020 Africa et al.
11,090,516 B2 8/2021 VanDerWoude et al.
2001/0032348 A1* 10/2001 Diaz .................. A41D 13/1153 2/424
2003/0182710 A1 10/2003 Klotz et al.
2003/0191516 A1 10/2003 Weldon et al.
2004/0111788 A1* 6/2004 Chou .................. A63B 33/004 2/426
2005/0010992 A1* 1/2005 Klotz ..................... A42B 3/225 2/171.3
2005/0117327 A1* 6/2005 Gupta ...................... F21L 14/00 362/103
2006/0133069 A1* 6/2006 Clupper ................. A42B 3/044 362/106
2007/0028372 A1* 2/2007 Van .......................... A42B 3/30 2/457
2007/0050898 A1* 3/2007 Larson ................. A62B 18/045 2/456
2007/0272244 A1 11/2007 Witmer
2008/0017196 A1 1/2008 Kamneva
2009/0151054 A1* 6/2009 VanDerWoude ....... A42B 3/286 2/410
2010/0229870 A1* 9/2010 Green .................... A42B 3/286 128/205.27
2013/0014316 A1* 1/2013 Castro .................... G02C 11/00 2/427
2014/0116430 A1* 5/2014 Patil ..................... A62B 18/082 128/201.25
2015/0375019 A1 12/2015 VanDerWoude et al.
2020/0001123 A1 1/2020 VanDerWoude et al.

FOREIGN PATENT DOCUMENTS

JP 2010523190 A 7/2010
KR 100933465 B1 * 12/2009

OTHER PUBLICATIONS

English language abstract and machine-assisted English translation for JP 2005-087429 extracted from espacenet.com database on Mar. 5, 2018, 7 pages.
English language abstract for JP 2010-523190 extracted from espacenet.com database on Mar. 5, 2018, 2 pages.
English language abstract not found for JPS 50-136989; however, see English language equivalent U.S. Pat. No. 3,943,575. Original document extracted from espacenet.com database on Mar. 5, 2018, 4 pages.
PCT "International Search Report and Written Opinion" for PCT/US2014/025919, Dec. 2014.

* cited by examiner

PERSONAL PROTECTION SYSTEM

RELATIONSHIP TO PRIORITY APPLICATIONS

This application is a continuation of U.S. patent application Ser. No. 16/568,957 filed 12 Sep. 2019. U.S. patent application Ser. No. 16/568,957 is a continuation of U.S. patent application Ser. No. 14/850,525 filed 10 Sep. 2015. U.S. patent application Ser. No. 14/850,525 is a continuation of PCT App. No. PCT/US2014/025919 filed 13 Mar. 2014. PCT App. No. PCT/US2014/025919 is a non-provisional of U.S. Provisional Pat. App. No. 61/783,234 filed 14 Mar. 2013. The above-listed priority applications are incorporated herein by reference.

BACKGROUND OF THE INVENTION

Personal protection systems are used in surgical procedures to provide a sterile barrier between the surgical personnel and the patient. Examples of personal protection systems can be found in the Inventor's Assignee's U.S. Pat. No. 7,735,156 issued 15 Jun. 2010, U.S. Pat. No. 7,752,682 issued 13 Jul. 2010 and U.S. Pat. No. 8,234,722 issued 7 Aug. 2102 each of which is incorporated herein by reference.

The above identified patents disclose a personal protection system incorporating a helmet that supports a toga or a hood. This assembly is worn by medical/surgical personnel to establish a sterile barrier. The toga or the hood includes a transparent face shield. The helmet includes a ventilation unit that includes a fan. The ventilation unit draws air through the toga/hood so the air is circulated around the wearer.

The circulating air reduces both the amount of heat that is trapped within the toga/hood and the carbon dioxide that builds up under the toga/hood. Because the filter section of the toga/hood appreciably restricts airflow into the fan, a higher capacity fan than would otherwise be necessary is utilized. The larger capacity fan is also accompanied by an unwelcome higher level of noise during operation that is annoying and distracting to the user.

Further, because the air within a medical/surgical facility, such as an operating room, contains undesirable micro-organisms and pathogens, it is desirable to eliminate as many of the micro-organisms as possible before the air is breathed by medical personnel.

Personal protection systems of the prior art do a reasonable job of providing a sterile barrier between the surgical personnel and the surrounding environment. However, there are some limitations associated with their use. The toga/hood that covers the wearer blocks sound waves. This means an individual wearing the system may have to speak loudly or shout to be heard. This is especially the case when the hooded individual is trying to communicate with another individual similarly attired in an operating room environment.

Some personal protection systems have incorporated wireless transceivers or radios into the helmet to allow communication between medical personnel. The use of wireless transceivers adds appreciable cost and complexity to the personal protection system. Further, in a hospital setting with multiple users in adjoining surgical facilities, cross-talk and electromagnetic interference between wireless transceivers is a concern.

Personal protection systems can also be used in sterile processing departments (SPD) that clean, disinfect and sterilize previously used soiled surgical instruments and tools. The personal protection system protects the operator from biological hazards contained on the soiled surgical instruments. Surgical instruments and tools are sent to the SPD for sterilization after they are used in medical procedures. In the SPD, operators manually wash and clean the instruments and then load them into sterilizers to be heated and exposed to chemical sterilants. It is important for personnel working in the SPD to be able to visually detect any debris and bits of body tissue or medical waste that are retained to the surgical instruments in order to remove the contaminants during the cleaning process.

SUMMARY OF THE INVENTION

This invention is related to personal protection systems that provide protection to a user from an external environment. The personal protection system includes a helmet worn over the head of the user. The helmet has a head band that is disposed above the face of the wearer. A hood is disposed over the helmet. The hood has a transparent face shield that is forward of the head band and a filter for filtering air entering the filter from the external environment. A fastening assembly is integrated with the helmet to hold the hood, including the face shield over the helmet. A ventilation assembly is integral with the helmet. The ventilation assembly has a fan and a duct that is connected to the fan to convey air. The duct has an inlet section through which air is drawn and an outlet section through which air is discharged. An ultraviolet light assembly is coupled to the ventilation assembly. The ultraviolet light assembly is positioned to emit ultraviolet light into the duct so that air drawn through the duct is exposed to ultraviolet light. The ultraviolet light allows the use of a filter that is less restrictive to airflow.

The hood includes one or more openings that are dimensioned to receive a sound transmission insert that is mounted over the openings. The sound transmission insert is formed from a material that has a greater sound permeability than the material that forms the remainder of the hood.

Some versions of the invention include an inspection light assembly. The inspection light assembly includes an ultraviolet light source and is mounted to the helmet. The ultraviolet light source is positioned facing an interior surface of the face shield such that ultraviolet light from the ultraviolet light source is transmitted through the face shield. The face shield includes an ultraviolet blocking lens that prevents ultraviolet light external to the face shield from being transmitted through the face shield.

BRIEF DESCRIPTION OF THE DRAWINGS

The invention is pointed out with particularity in the claims. The above and further features and advantages of this invention are understood from the following Detailed Description taken in conjunction with the accompanying drawings in which:

DETAILED DESCRIPTION

I. Overview

Figure 1:
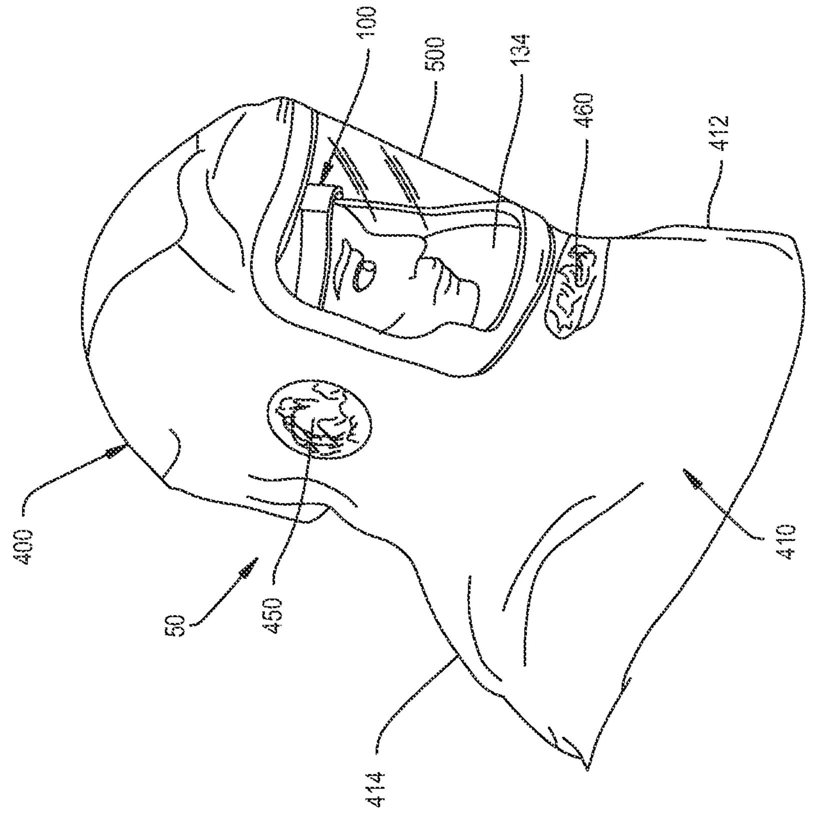
FIG. 1 is an overall perspective view of a personal protection system with a hood draped over a helmet in accordance with one embodiment of the present invention.
Figure 3:
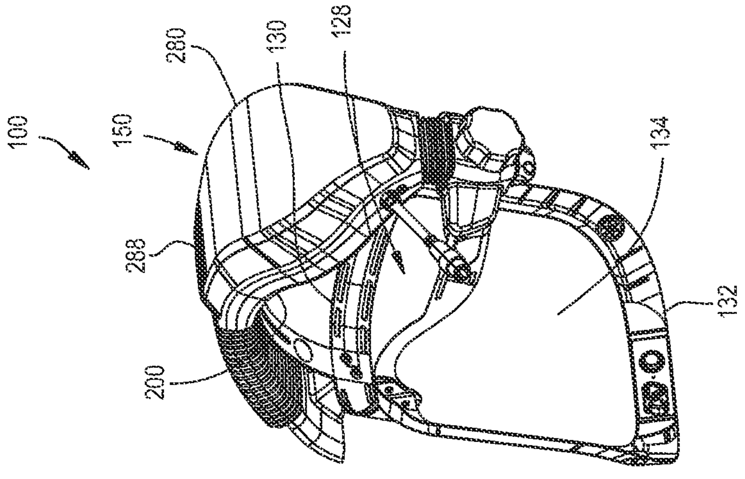
FIG. 3 is rear perspective view of the helmet of FIG. 1.

Referring to FIG. 1, a personal protection system 50 is illustrated. Personal protection system 50 includes a head unit, helmet assembly or helmet 100 that is worn on the head of a user and a hood 400 with an integrated face shield 500 this is draped over the helmet. The system 50 creates a sterile barrier between the wearer and an external environment. The personal protection system 50 is useful in many medical environments, but is particularly adapted for use in surgery to protect patients from contamination during surgical procedures and to protect medical professionals from exposure to airborne contaminants and bodily fluids.

Hood 400 has a distal facing front section 412 and a proximal facing rear section 414. "Distal", it shall be understood means toward a surgical site that the wearer of personal protection system 50 is facing. "Proximal", means away from the surgical site that the wearer of personal protection system 50 is facing. Face shield 500 is mounted in distal facing front section 412.

II. Helmet With Ultraviolet Light Positioned in the Air Flow Path

FIGS. 2-8 illustrate the helmet 100. The helmet 100 is generally adapted from the head units and helmets shown in Applicant's Assignee's U.S. Pat. No. 7,735,156 issued on Jun. 15, 2010, and U.S. Pat. No. 8,282,234 issued on Oct. 9, 2012, the entire contents of which are explicitly incorporated herein by reference.

The primary difference between the head units or helmets of these documents and the helmet 100 of the present invention is the addition of an ultraviolet light assembly 300 to the helmet 100. Otherwise, the head units or helmets disclosed in these references are suitable for use in the personal protection system 50 of the present invention.

The helmet 100 includes a support structure 128. The support structure 128 includes an adjustable head band 130 for mounting the helmet 100 to a head of the user. A generally U-shaped chin bar 132 depends downwardly from the head band 130 to define a facial opening 134. The chin bar 132 holds the hood 400 away from the face of the wearer.

A ventilation assembly 150 is coupled to support structure 128. Ventilation assembly 150 includes a lower shell 200 that faces the wearer, an upper shell 250 facing away from the wearer, an intake cover 280, and a fan 211. Lower shell 200 is attached to support structure 128. The upper shell 250 is attached to the lower shell 200. The upper shell 250 is spaced apart from the lower shell 200 to define at least one air flow channel 192 between the upper and lower shells. The shells 200 and 250 are formed of acrylonitrile butadiene styrene (ABS), polypropylene or other plastic materials.

Lower shell 200 is formed with several internal features. Lower shell 200 has a front end 202, a back end 203, a convex outer lower surface 204 and a concave inner surface 205. A peripheral side wall 206 extends upwardly away from the outer edges of inner surface 205. A semi-circular scroll housing wall 207 is formed with lower shell 200 and extends generally perpendicularly upwards from inner surface 205. Inner surface 205 and scroll housing wall 207 define a fan cavity 208. A printed circuit board cavity 210 is defined between inner surface 205, the front end 202 of lower shell 200 and a portion of scroll housing wall 207.

The fan 211 includes a fan motor 212 and fan blades 214. The fan motor 212 is attached to inner surface 205 within scroll housing wall 207. The fan blades 214 are coupled to the fan motor 212 and are disposed in fan cavity 208 slightly spaced from and surrounded by scroll housing wall 207. The fan motor 212 is electrically connected to a fan motor connector 215 that in turn is attached to fan motor cable 216. Fan motor cable 216 is connected to helmet external cable 217. Helmet external cable 217 is connectable with an external power source such as a battery. The rotation of fan motor 212 causes the like rotation of fan blades 214 in order to create a flow of air into personnel protection system 50.

Four mounting posts 218 are formed with lower shell 200 and extend generally perpendicularly away from inner surface 205. Two of the posts 218 are located at front end 202 and two of the posts 218 are located at back end 203. Mounting posts 218 receive fasteners 219. Fasteners 219, such as self tapping screws, retain upper shell 250 to posts 218 and lower shell 200. Three support arms 220 are formed with lower shell 200 and extend generally perpendicularly away from inner surface 205.

Upper shell 250 has a front end 252, a back end 253, a concave lower surface 254 and a convex outer surface 255. A peripheral side wall 256 extends downwardly away from the outer edges of surface 254. Fan opening 258 is defined in upper shell 250 and is positioned above fan blades 214. Four holes 259 are defined in upper shell 250. Two of the holes 259 are located toward front end 252 and the other two holes 259 are located toward end 254. Fasteners 219 extend through holes 259 and are received by posts 218 so that upper shell 250 is retained to lower shell 200.

A raised section 260 is formed with upper shell 250 and extends upwardly from outer surface 255. Raised section 260 is positioned between front end 252 and opening 258.

Figure 4:
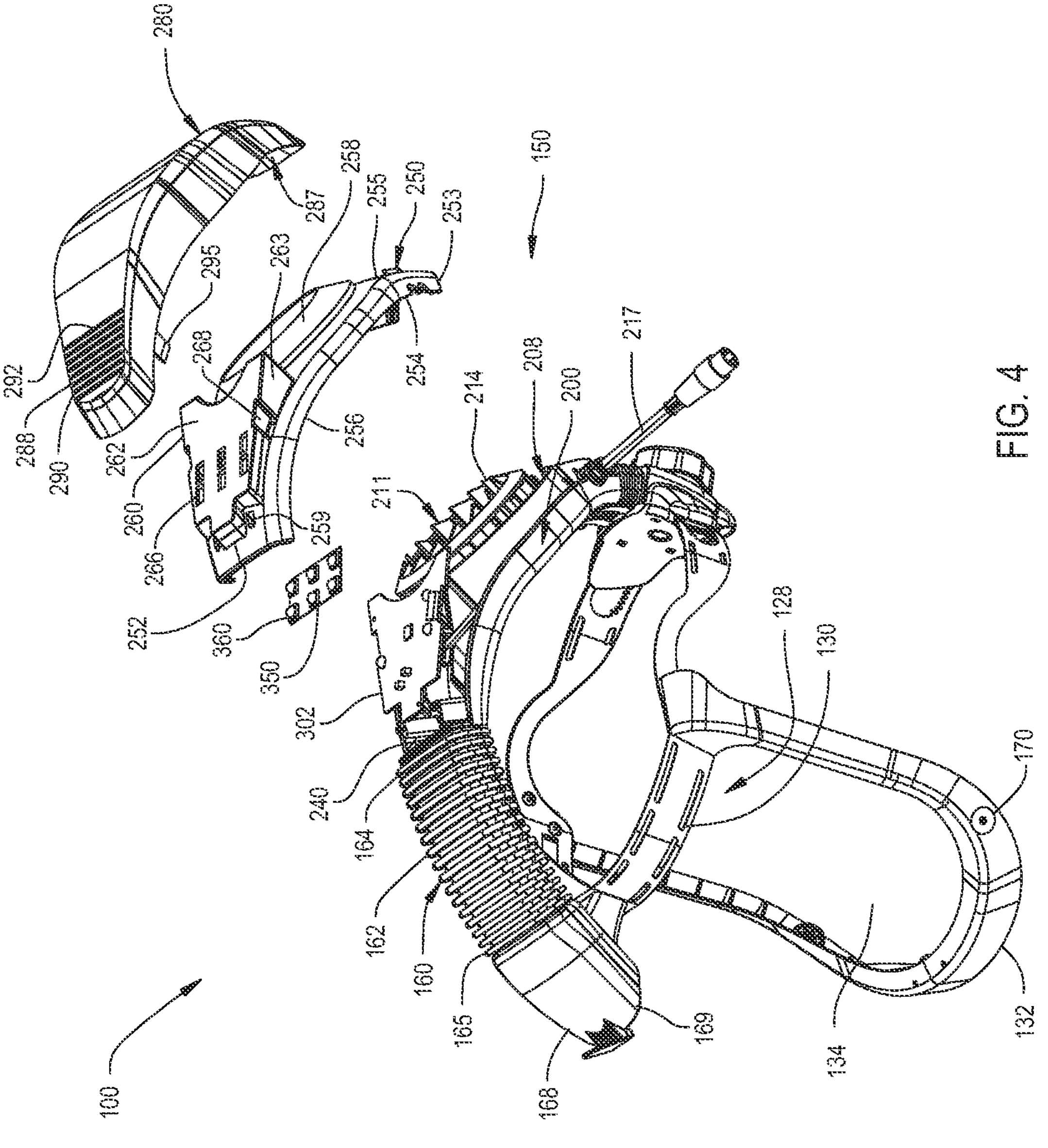
FIG. 4 is a partial exploded view of the helmet of FIG. 1.
Figure 5:
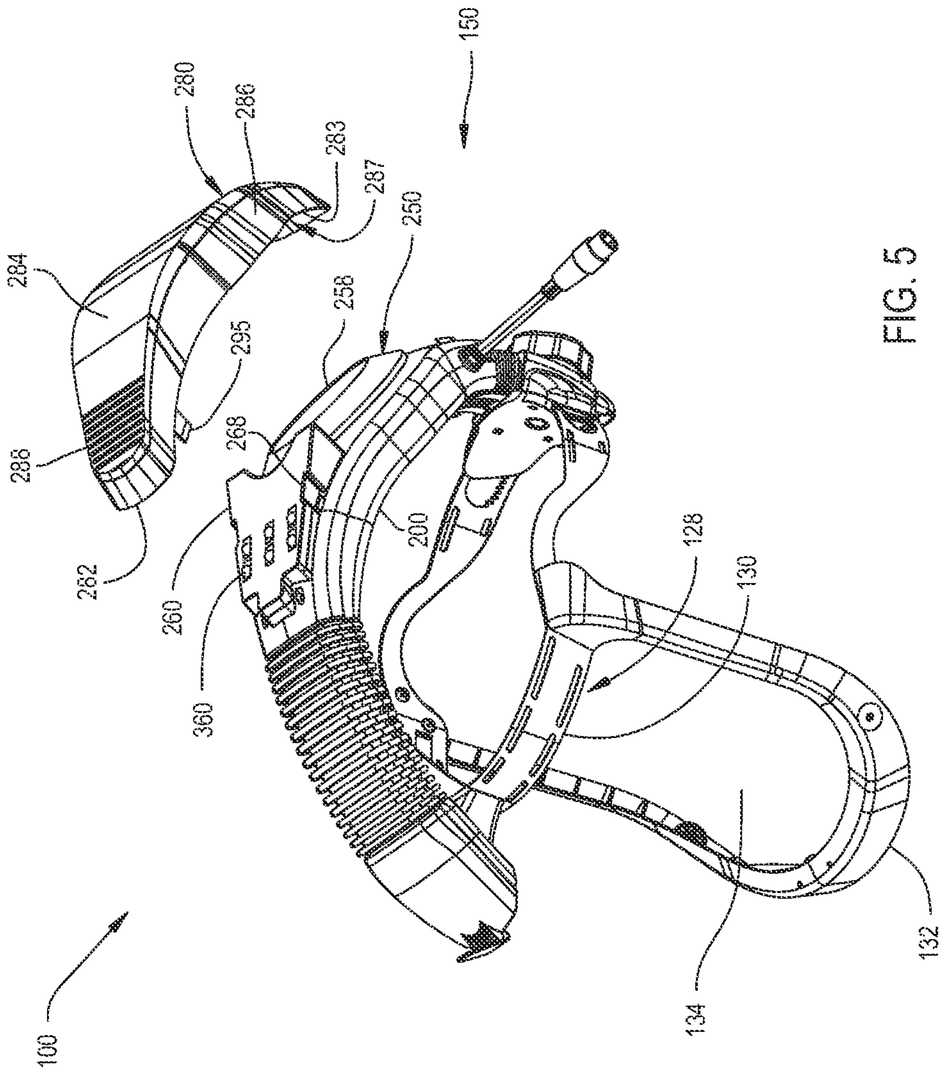
FIG. 5 is another partial exploded view of the helmet of FIG. 1.
Figure 8:
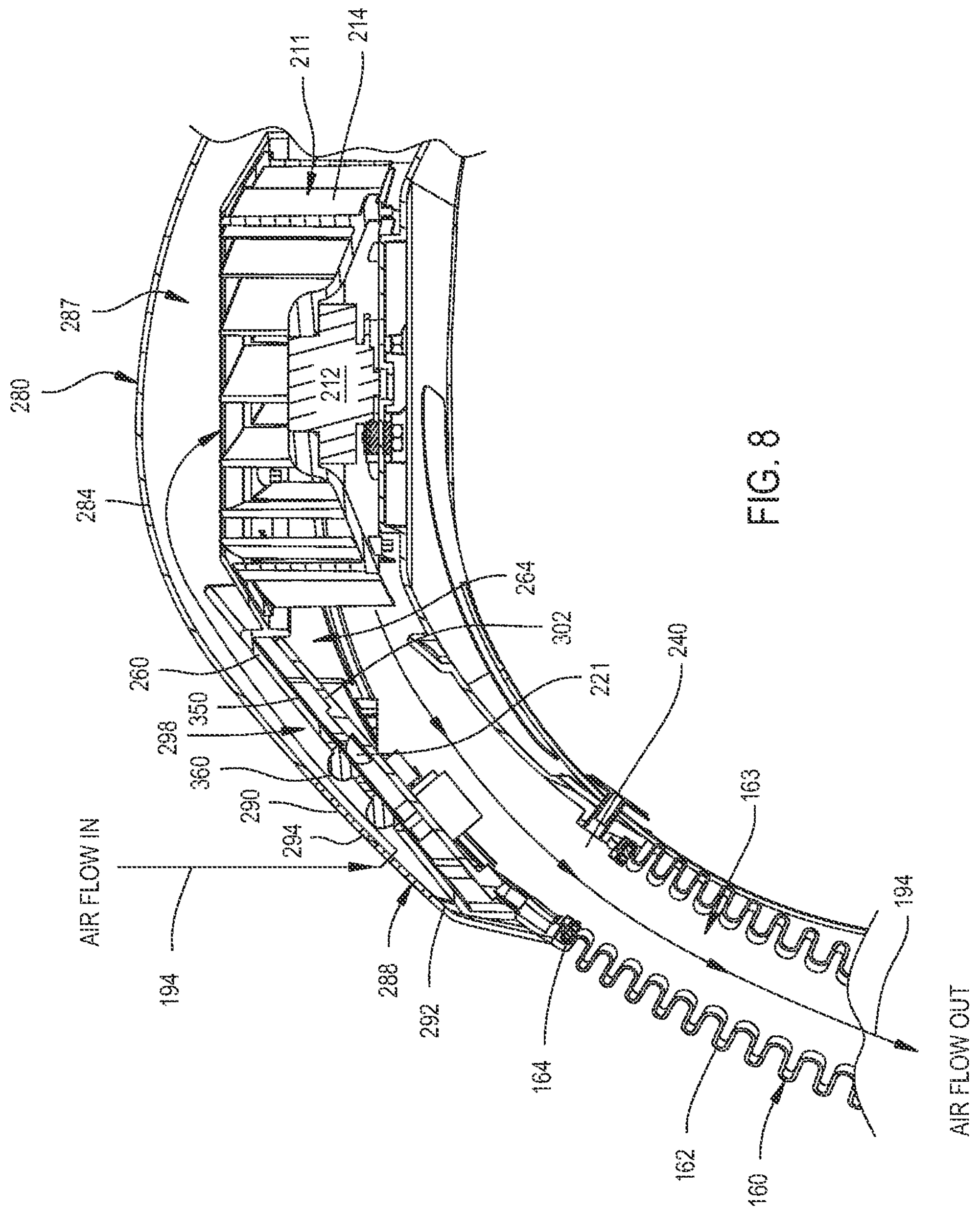
FIG. 8 is an enlarged cross-sectional view of the helmet showing the air flow path.

Raised section 260 includes a planar slanted top panel 262 and side walls 263 that extend downwardly from top panel 262 and connect to outer surface 255. The bottom side of top panel 262 and side walls 263 define a recessed area or recess 264 (FIG. 8). Light openings 266 are formed in top panel 262. While six light openings 266 are shown in FIG. 4, more or fewer light openings 266 can be defined in top panel 262. Raised section 260 further includes two diametrically opposed rectangular shaped slots 268 that are formed in side walls 263 and extend into outer surface 255.

Intake cover 280 is mounted to the upper shell 250. The intake cover 280 is contoured to match the shape of upper shell 250. Intake cover 280 has a front end 282, a back end 283 and a top wall 284 that is spaced from the outer surface 255 of upper shell 250. A peripheral side wall 286 extends downwardly away from the outer edges of top wall 284. The bottom side of top wall 284 and side wall 286 define a chamber 287.

An intake grid or grill 288 is defined in top wall 284 toward front end 282. Intake grill 288 is formed by a series of parallel rails or slats 290 that extend across an intake opening 292. A series of parallel slits 294 (best seen in FIG. 8) are shaped between the parallel slats 290. Air is drawn into the ventilation assembly 150 through the intake grill 288 by the fan 211. Specifically, air is drawn through slits 294 and into chamber 287 by fan 211.

Intake cover 280 is mounted over upper shell 250. Retention features 295 such as flexible snap fit tabs are formed with intake cover 280 and extend downwardly away from side wall 286. Retention features 295 fit into and mate with slots 268 of upper shell 250 to hold intake cover 280 to upper shell 250. A duct 298 (FIG. 8) is defined between the bottom side of top wall 284 and the top side of top panel 262. The slits 294, duct 298 and chamber 287 are all connected and contiguous with each other forming a unitary air flow path. Air is drawn through slits 294, duct 298 and chamber 287 by fan 211.

Figure 6:
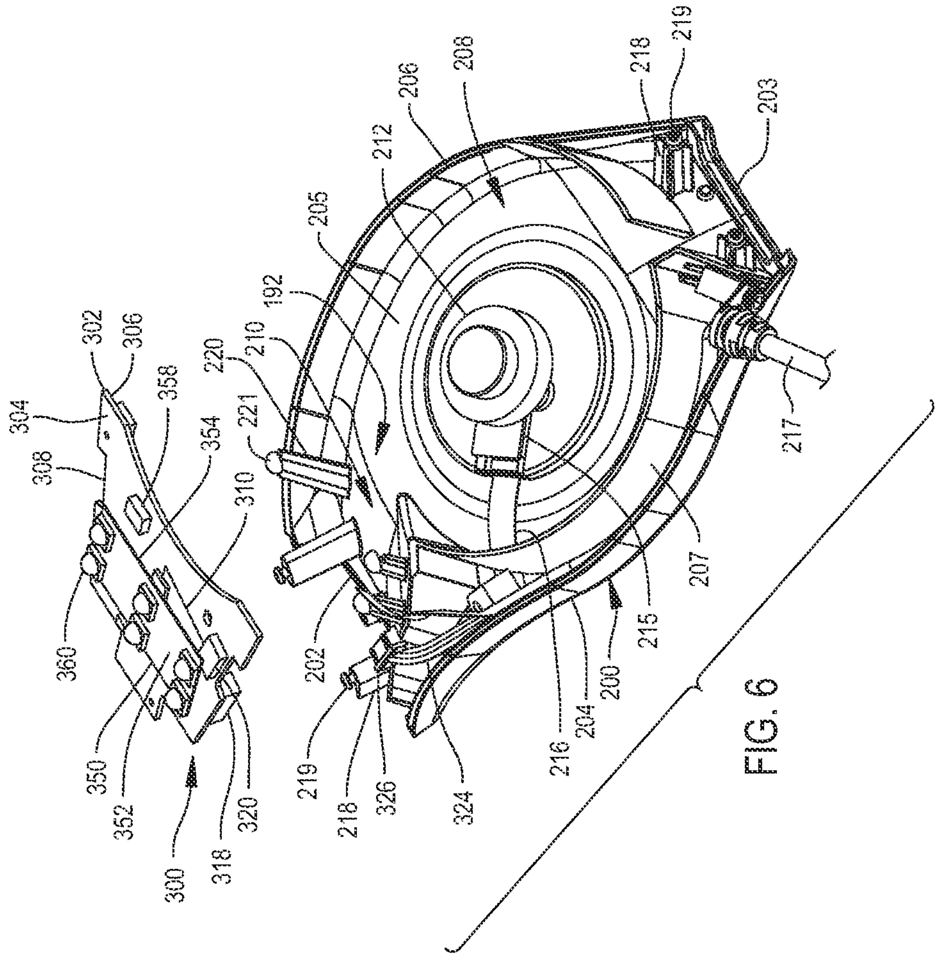
FIG. 6 is an enlarged exploded view of the lower shell and printed circuit boards.
Figure 7:
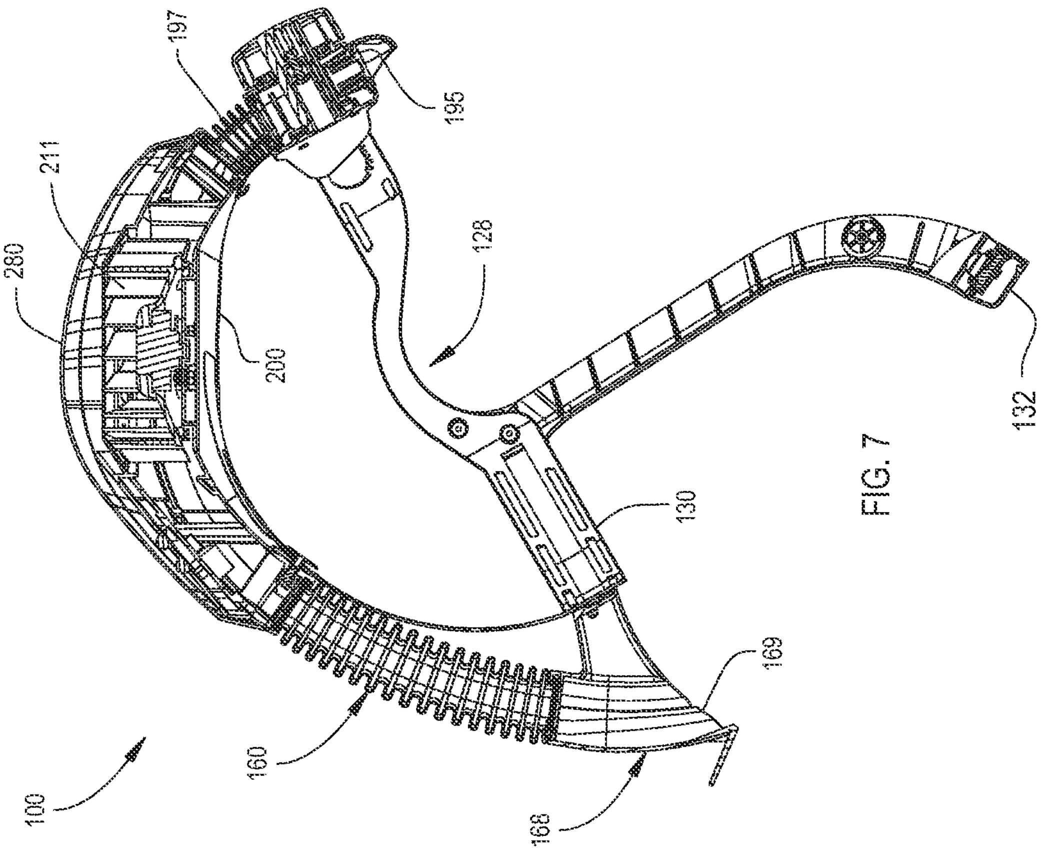
FIG. 7 is a cross-sectional view of the helmet of FIG. 1.

With continued reference to FIGS. 4 and 6, the ultraviolet light assembly 300 is now described. Ultraviolet light assembly 300 comprises a primary printed circuit board (PCB) 302 and a light emitting diode (LED) printed circuit board (PCB) 350. PCB 302 is generally trapezoidal shaped and has an upper surface 304 and a bottom surface 306. Two diametrically opposed notches 308 are defined in opposite sides of PCB 302. In one embodiment, primary PCB 302 is a multi-layered printed circuit board that has several printed circuit lines 310 (only one of which is shown in FIG. 6).

Primary PCB 302 is received by printed circuit board cavity 210 of lower shell 200. When primary PCB 302 is positioned in printed circuit board cavity 210, posts 220 extend through holes in primary PCB 302. With primary PCB 302 in printed circuit board cavity 210, the ends of posts 220 are heated and melted to form a heat stake 221 that extends over upper surface 304. Heat stake 221 holds primary PCB 302 to lower shell 200.

Electronic components are mounted to both the upper surface 304 and bottom surface 306 of primary PCB 302 and are interconnected by printed circuit lines 310. In an illustrative embodiment, a fan motor driver circuit 318 is mounted to bottom surface 306. Fan motor driver circuit 318 is communicatively coupled to fan motor 212 via a connector receiving unit 320. Connector receiving unit 320 is attached to the top surface 304 of primary PCB 302. The fan motor driver circuit 318 controls the operation of fan motor 212 including the rotational speed of fan blades 214.

Connector receiving unit 320 mates with connector insertion unit 326 to form one or more electrical connections. Connector insertion unit 326 is attached to PCB cable 324. PCB cable 324 is retained to lower housing 200 and is connected to and in communication with fan motor cable 216 and external cable 217.

LED PCB 350 has a top side 352 and a bottom side 354. LED PCB 350 includes several printed circuit lines (not shown) that interconnect the electronic components mounted to LED PCB 350. The bottom side 354 of LED PCB 350 is electrically connected to the top side 304 of primary PCB 302 by suitable electronic assembly techniques such as soldering or wire bonding.

Six ultraviolet light emitting diodes (UVLED) 360 are mounted to the top side 352 of LED PCB 350. While six UVLEDS are utilized in the present example, more or fewer of UVLED 360 can be used. UVLED 360 are mounted to the top side 352 by suitable electronic assembly techniques such as soldering. Suitable ultraviolet light emitting diodes 360 are commercially available as model number LZ-100U600 from LED ENGIN Corporation having offices in San Jose, California.

In one embodiment, an LED driver circuit 358 is mounted to top surface 306 and is electrically connected to UVLEDS 360. LED driver circuit 358 functions to operate UVLEDS 360 supplying the required power and current levels. In one embodiment, LED driver circuit 358 supplies a constant current to UVLEDS 360 as the battery voltage drops preventing dimming of UVLEDS 360.

During assembly, upper shell 250 is mounted over primary PCB 302 and LED PCB 350 such that top panel 262 covers primary PCB 302 and LED PCB 350. PCB 302 and LED PCB 350 are disposed in recess 264. UVLEDS 360 extend through openings 266 and face into duct 298 (see FIG. 8). UVLEDS 360 are positioned below intake grid 288 and face slats 292 and slits 294.

Each ultraviolet light emitting diode 360 emits light in the ultraviolet frequency spectrum. Specifically, UVLED 360 emits ultraviolet (UV) light having wavelengths between 325 and 400 nanometers. Exposure to UV light can destroy or kill various pathogens such as bacteria, viruses, biological cells and fungal spores.

Turning to FIGS. 4, and 8, helmet 100 further comprises a nozzle assembly 160 that is attached to ventilation assembly 150. After upper shell 250 is mated with lower shell 200, a substantially rectangular shaped opening 240 is formed between front end 252 of upper shell 250 and front end 202 of lower shell 200. Nozzle assembly 160 includes a flexible elastomeric bellows 162 and a discharge nozzle 168. Bellows 162 expands and contracts and has an internal conduit 163.

The conduit 163, sometimes referred to as a duct, carries forced air from fan 211 to discharge nozzle 168. Bellows 162 has an upper end 164 that is connected to shell ends 240 and 252 such that conduit 163 is contiguous with opening 240. The lower end 165 of bellows 162 is coupled to discharge nozzle 168. Discharge nozzle 168 has an outlet 169. Air from fan 211 is discharged through outlet 169.

Helmet 100 also includes a rear nozzle, nozzle 195. Nozzle 195 is mounted to the headband so as to be directed towards the neck of the wearer. A rear bellows 197 extends from the rear end of the lower and upper shells 200 and 250, respectively. The bellows 197 defines the conduit, the duct, through which air discharged by the fan is flowed to the rear nozzle 195.

In operation, the fan motor 212 rotates the fan blades 214 to draw air through slits 294, duct 298, and chamber 287 into fan 211. The air is discharged from fan 211 through channel 192 (FIG. 6), opening 240, conduit 163, exiting at discharge nozzle opening 169 (FIG. 4). Slits 294, duct 298, chamber 287, channel 192 opening 240, conduit 163 and discharge nozzle opening 169 all form a continuous air flow path 194. The air flowing through discharge opening 169 is directed toward the user's head and face providing fresh purified air to the user. A fraction of the air forced through the ventilation assembly also through the rear bellows 197. This air is flows through and discharged from the rear nozzle 195.

Because UVLEDS 360 (FIG. 8) are positioned below intake grid 288 and face slits 294 and face into duct 298, the incoming air to the helmet 100 is exposed to ultraviolet light generated by UVLEDS 360. Micro-organisms entrained with the incoming air are subjected to UV light exposure causing the micro-organisms to be rendered harmless or innocuous. Collectively, the components forming helmet 100 are designed so that the air drawn into the system 50 and discharged through the outlet ducts is exposed to UV light for a time period of at least 0.05 seconds, more ideally, at least 0.1 seconds and more ideally still at least 0.25 seconds. By way of example, exposing the air stream containing the influenza A virus to UV light using the above-described configuration of the invention for at least 0.1 second is believed to render at least at least 50% of the viruses innocuous. Exposing the air stream containing the influenza A virus to UV light using the above-described configuration of the invention for at least 0.25 seconds is believed to render at least at least 99% of the viruses innocuous.

Owing to the use of UV light assembly 300 and UVLEDS 360, the filter section 430 (FIG. 10) of hood 400 (FIG. 10) can be formed from a less restrictive filter material than would otherwise be required to purify incoming air to personal protection system 50. When UVLEDS 360 are used, filter section 430 has a higher air flow transmission rate because the ultraviolet light functions to eliminate pathogens in the incoming air that were able to pass through filter section 430.

With the light assembly 300 and UVLEDS 360 positioned in the flow of incoming air, the flowing air removes heat generated by light assembly 300. This air is exhausted out of hood 400 (FIG. 10), reducing the buildup of heated air adjacent the light assembly 300 and improving comfort of the user of personal protection system 50.

Figure 9:
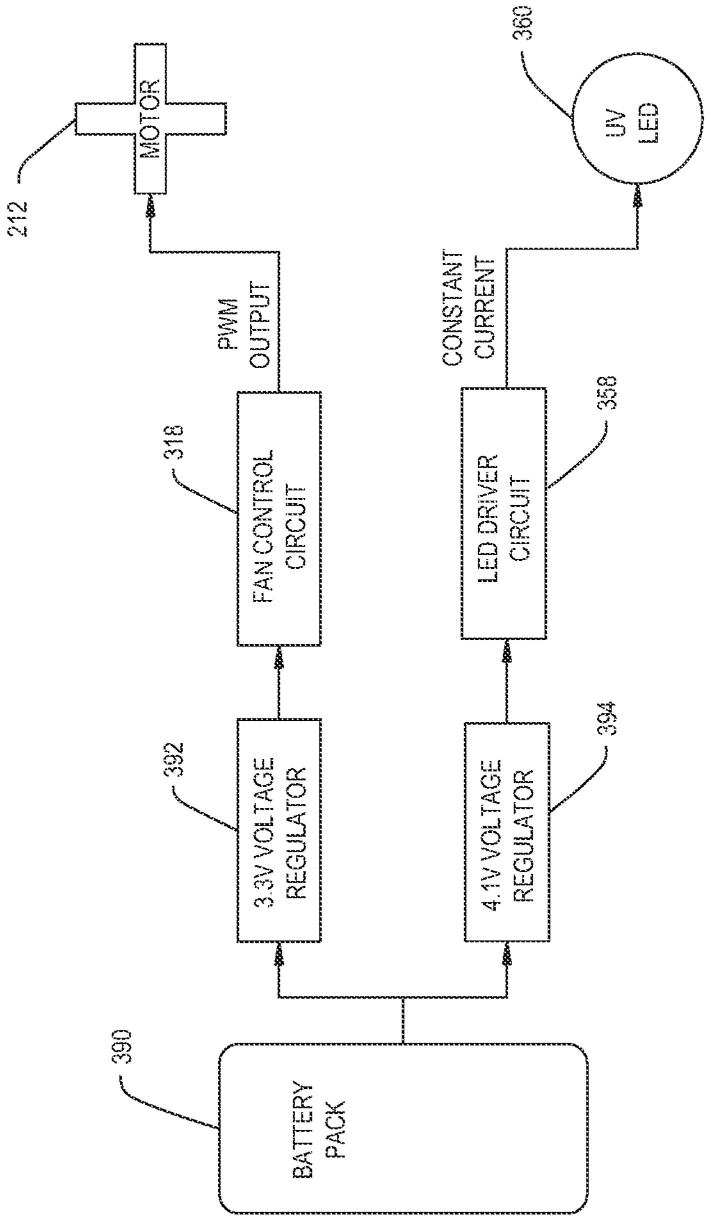
FIG. 9 is an electrical block diagram illustrating the power circuit to the fan and lights.

FIG. 9 illustrates electrical circuits for fan motor 212 and UVLEDS 360. A battery 390 provides electric power to both fan motor 212 and light assembly 300. Battery 390 can be either a rechargeable battery or non-rechargeable (i.e. disposable) battery. In one embodiment, battery 390 is a 6 volt DC battery. The battery 390 is worn by the user on a belt or clipped to clothing and is attached to external cable 217 (FIG. 2) in order to supply power to helmet 100.

Battery 390 is connected to a power supply circuit including a 3.3 volt voltage regulator circuit 392. Voltage regulator circuit 392 is connected to fan control circuit 318, which in turn is connected to fan motor 212 via cable 216 (FIG. 6). Voltage regulator 392 applies a constant 3.3 volts to fan control circuit 318 for energizing the control circuit. Fan control circuit 318 drives fan motor 212. Fan control circuit 318 controls the rotational speed of fan 211. A switch button (not shown) can be mounted to helmet 100 to turn fan 211 on and off.

Battery 390 is also connected to a 4.1 volt voltage regulator 394. Voltage regulator 394 is connected to the LED driver 358, which in turn is connected to UVLEDS 360 through PCBS 302 and 350 (FIG. 6). Voltage regulator 394 applies a constant 4.1 volts to LED driver circuit 358 for energizing the UVLEDS 360. LED driver circuit 358 drives UVLEDS 360. LED driver circuit 358 turns UVLEDS 360 on an off. In one embodiment, UVLEDS 360 are turned on whenever fan 211 is operating. In another embodiment, a switch button (not shown) allows a user to selectively turn UVLEDS 360 on and off.

Voltage regulator circuits 392 and 394, fan control circuit 318 and LED driver circuit 358 are all mounted to primary PCB 302 (FIG. 6). Primary PCB 302 is electrically connected to battery 390 via connector 326, 320, PCB cable 324 and external cable 217.

III. Hood and Shell with Improved Sound Transmission

Figure 10:
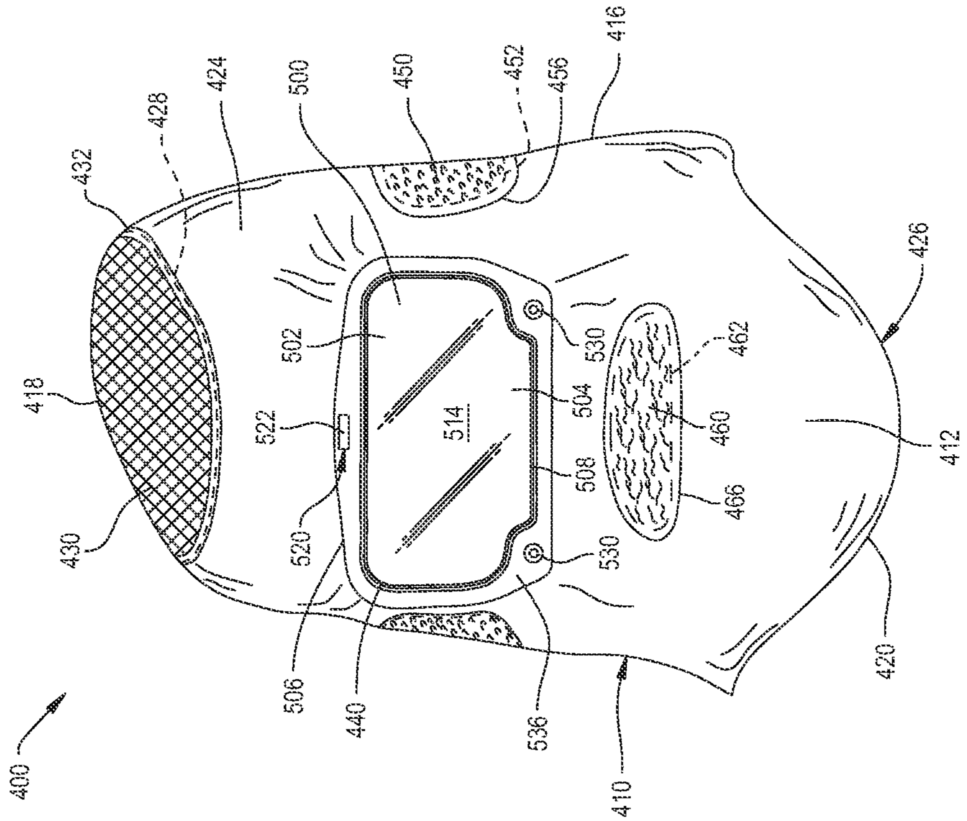
FIG. 10 is a rear view of the face shield with the hood turned inside out illustrating the sound transmission inserts in accordance with one embodiment of the present invention.
Figure 11:
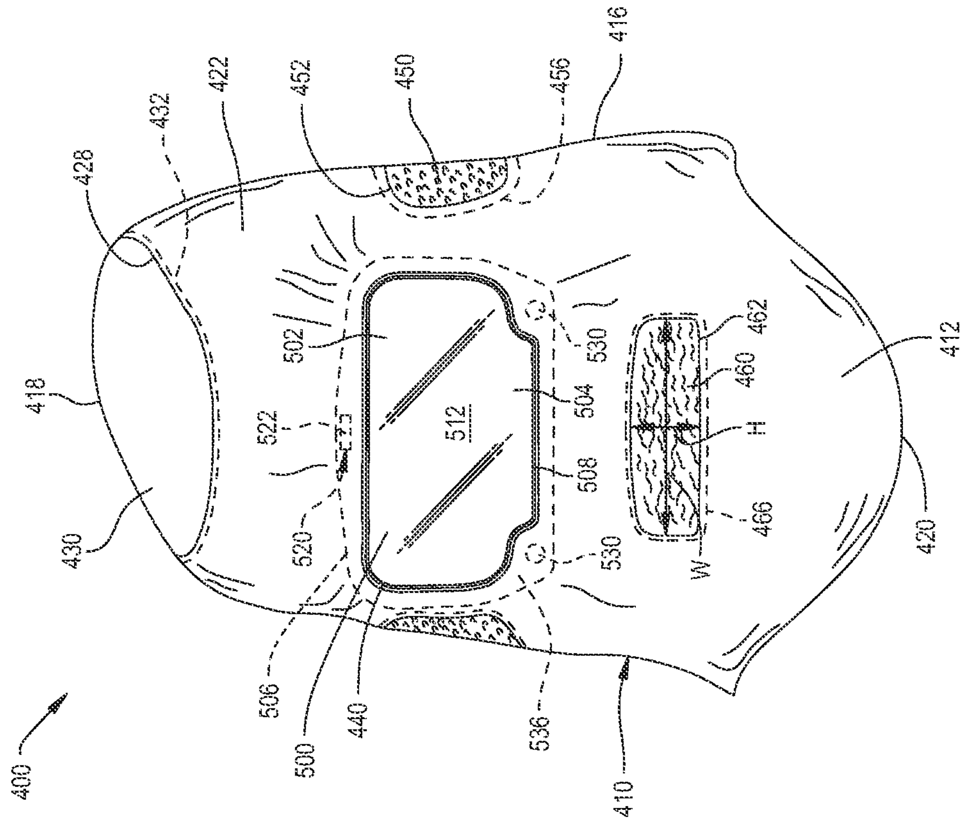
FIG. 11 is a front view of the hood.
Figure 12:
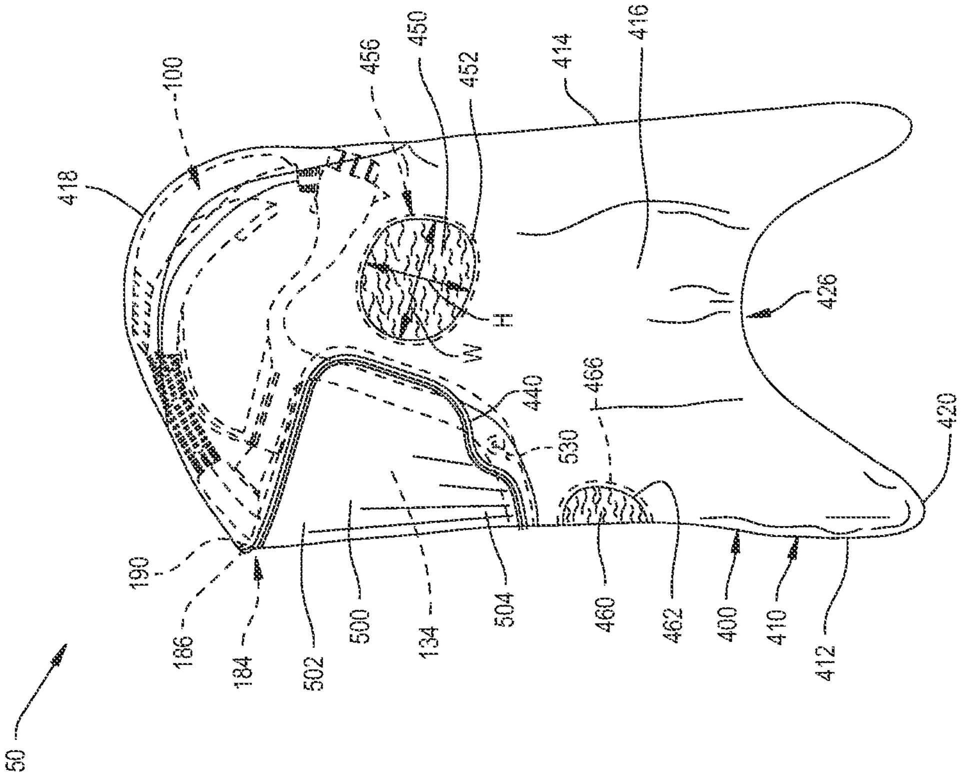
FIG. 12 is a left side view of the hood.

Referring to FIGS. 10-12, the hood 400 is shown. FIG. 11 illustrates an outside view of the hood 400, while FIG. 10 shows the hood 400 in a position turned inside out depicting the interior of hood 400. In the illustrated version of the invention the hood is formed to not extend beyond the shoulders of the individual wearing the system 50. In one embodiment, the hood is a hood 400 that drapes over the helmet 100 and terminates just over the wearer's shoulders. In another embodiment, the hood 400 is part of a toga. A toga is a garment with covers at least the chest and arms of the individual wearing the personal protection system 50. Often a toga is designed to extend to at least the knees of the person wearing the toga.

The hood 400 includes a flexible shell 410. Shell 410 is formed from a barrier fabric such as a multi-laminate nonwoven material comprised of polyethylene, polypropylene, or polyester, or any combination thereof. More specifically, the material from which the shell 410 is formed is material that prevents fluids and particulate from passing therethrough. Shell 410 has a distal facing front section 412, a proximal facing rear section 414, side sections 416, a top 418 and a bottom 420. Shell 410 includes an outer surface 422, an interior surface 424 and an interior space 426 that is defined by interior surface 424. An oval shaped filter opening 428 is defined in the top 418 of the shell and a face shield opening 440 is defined in the front 412 of the shell.

A filter section 430 is mounted over opening 428 and is attached to shell 410 at the edges of opening 428. In one embodiment, filter section 430 is attached to shell 410 by sewing techniques using thread to form a seam 432. In another embodiment, filter section 430 is attached to the shell 410 by an adhesive. Filter section 430 slightly overlaps shell 410 onto interior surface 424. Intake cover 280 (see FIG. 4) spaces the filter section 430 out away from the ventilation assembly 150.

Due to the use of UV light assembly 300 (FIG. 4) and UVLEDS 360 (FIG. 4), filter section 430 is formed from a less restrictive filter material than would otherwise be required to purify incoming air to personal protection system 50. Filter 430 is formed from a medium such as a meltblown or triboelectret nonwoven fabric having porosity suitable for filtering particles of 0.1 microns or greater from air entering the shell 410 from the external environment. This fabric is less restrictive than the fabric from which filters for conventional hoods are formed. Owing to the relatively less restrictive nature of the material forming filter 430, system 50 does not require the same relatively high vacuum draw to pull the same volume of air into the hood as a system with hood having a conventional filter section.

Thus in a version of the invention in which the air flow across filter 430 is at rate of 425 l/min, the pressure drop across the filter is typically a maximum of 5 Pascals and more often a maximum of 3 Pascals. In comparison, the pressure drop across a filter of a conventional personal protection system at the above air flow rate is at least 10 Pascals.

The less restrictive filter section 430 allows for a lower speed fan to be used in helmet 100. while still providing the same volume of air flow. A lower speed fan is quieter and more comfortable environment for the wearer than the fans of the conventional personal protection systems.

Figure 14:
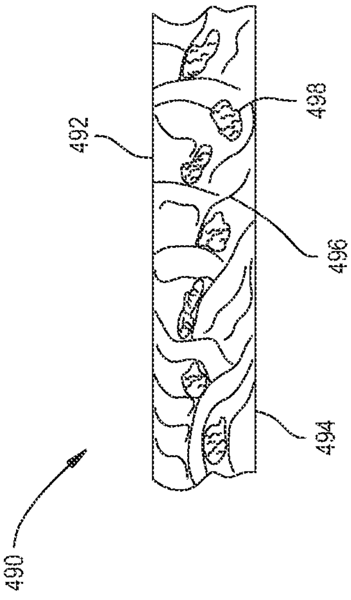
FIG. 14 is a cross-sectional view of a filter section that incorporates activated charcoal.

Turning to FIG. 14, a cross section of an alternative filter 490 is shown. Filter 490 is similar to filter 430. Filter 490 further includes activated charcoal particles 498 embedded into the nonwoven filter medium 496. Filter section 490 includes a top surface 492 and a bottom surface 494. Activated charcoal particles 498 are embedded between top surface 492 and bottom surface 494 within the nonwoven filter medium material 496.

The filter medium 496 is the same material from which filter 490 is formed and can have the same porosity. The embedded activated charcoal particles 498 trap smoke and odors in the air generated during normal surgical activities such as tissue cauterization.

A flexible and transparent face shield 500 permits the user to see or view through the hood 400. As shown in FIG. 1, the face shield 500 is mounted to distal facing front section 412 such that the face shield 500 covers the facial opening 134 of the helmet 100 after the user dresses into the personal protection system 50. The facial opening 134 of the helmet 100 receives the face shield 500.

Referring specifically to FIGS. 10-12, the face shield 500 includes a top portion 502, a bottom portion 504, an outer peripheral edge 506 and a sealing perimeter 508. Face shield 500 further has a distal facing outer surface 512 and a proximal facing interior surface 514. The top portion 502 defines the top one-half of the face shield 500 and the bottom portion 504 defines the bottom one-half.

Face shield 500 is mounted over opening 440 slightly overlapping inside surface 424. The shell 410 is sealed to the face shield 500 on an outside surface 512 of the face shield 500 along the sealing perimeter 508. The shell 410 can be sealed to the face shield 500 by suitable means such as using an adhesive or by welding. The face shield 500 is preferably formed of a sterilizable material. In one embodiment, the face shield 500 is formed of Lexan@8010 having a thickness of approximately 15 mils.

An upper mounting element 520 is disposed on the face shield 500 along the top portion 502. The upper mounting element 520 is centered on the face shield 500 along the top portion 502. The upper mounting element 520 is a rectangular shaped aperture 522 defined through the face shield 500. The upper mounting element 520 is configured for fastening to an upper mounting device 184 (FIG. 2) included on the helmet 100. The upper mounting device 184 is centered on the helmet 100 relative to the facial opening 134. The upper mounting device 184 is a single mounting clip 186 (FIG. 2) connected to the helmet 100, and that is positioned in a centered relationship relative to the facial opening 134.

Figure 2:
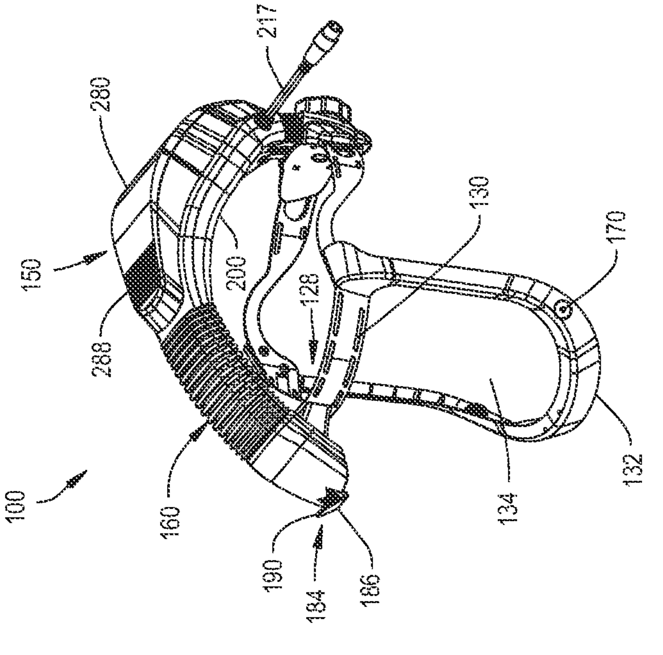
FIG. 2 is front perspective view of the helmet of FIG. 1.

As best shown in FIG. 2, the mounting clip 186 extends upwardly from a front nozzle assembly 160 of the helmet 100 away from the facial opening 134 to support the face shield 500. The mounting clip 186 includes a distal edge 190 extending outwardly from the nozzle assembly 160 such that a portion of the face shield 500 rests between the distal edge 190 and the nozzle assembly 160 after the face shield 500 is mounted to the mounting clip 186. The mounting clip 186 interlocks with the aperture 522 on the face shield 500 to automatically center the face shield 500 over the facial opening 134. Specifically, the mounting clip 186 protrudes through aperture 522 when mounting the face shield 500 to the helmet 100.

Turning to FIGS. 2, and 10-12, two lower mounting elements 530 are disposed on the face shield 500 along the bottom portion 504 inner surface 514 and facing in a proximal direction. The lower mounting elements 530 are magnets or are formed of magnetically attractive material. In one embodiment, the lower mounting elements 530 are steel rivets mounted to face shield 500. The lower mounting elements 530 are configured to fasten to lower mounting devices 170 on the chin bar 132 of the helmet 100 to secure the bottom portion 504 of the face shield 100 to the chin bar 132. The lower mounting devices 170 are preferably magnets or are formed of magnetically attractive material configured to attract the lower mounting elements 530.

Mounting elements 522 and 530 are preferably mounted along an outer portion 536 of the face shield 500. The outer portion 536 is defined between the outer peripheral edge 506 the face shield 60 and the sealing perimeter 508. As a result, when the shell 410 is glued or adhered to the face shield 500 along the sealing perimeter 508, the upper 520 and lower 530 mounting elements are hidden beneath the shell 410, out of view from an external perspective.

With reference to FIG. 1, hood 400 further includes passive communication aids to assist the wearer in communicating with others in the vicinity. Hood 400 has a pair of diametrically opposed sound transmission inserts 450 to allow the wearer of hood 400 to more easily hear sounds generated external to hood 400. Inserts 450 are positioned to be adjacent the ears of the wearer. A sound transmission insert 460 facilitates the transmission of speech (sound waves) generated by the wearer to the space outside of the hood 400. Insert 460 is positioned to be in front of the mouth of the wearer. Sound waves are transmitted with less distortion, a smaller insertion loss, through ear sound inserts 450 460 than through the fabric forming the shell 410 of the hood.

Ear and mouth sound transmission inserts allow a wearer of shell 410 to readily communicate with other personnel who are also wearing personal protection system 50. The use of ear and mouth sound transmission inserts 450, 460 can eliminate the need for active communication aids such as radios by the wearer.

As seen in FIGS. 10-12, a pair of diametrically opposed, generally round openings 452 are formed in side sections 416 of shell 410. Each opening is adjacent where the shell is located adjacent an ear. Openings 452 extend entirely through side sections 416. Each transmission insert 450 includes an outer circumferential or perimeter edge 456. The ear sound transmission insert 450 is mounted over opening 452 in a slightly overlapping relationship to inside surface 424. The insert 450 is sealed to shell side sections 416 along perimeter edge 456. Inserts 450 are sealed to shell 410 by suitable means such as by adhesive bonding, ultrasonic welding, heat sealing or by sewing.

Each insert 450 has a height H, defined within the opening 452, of at least 5 cm and a width W, perpendicular to the height H, defined within the opening 452 of at least 5 cm. In particular, the width W provides a suitable listening area for the wearer to hear activities occurring to the front, side and back of the wearer.

A generally oval or oblong shaped mouth opening 462 is formed in the distal front section 412 of shell 410. Mouth opening 462 extends through front section 412 of shell 410. Insert 460 includes an outer peripheral edge 466. The mouth sound transmission insert 460 is mounted over opening 462 in a slightly overlapping relationship to inside surface 424. The mouth sound transmission insert 460 is sealed to shell front section 412 along peripheral edge 466. The mouth sound transmission insert 460 is sealed to shell 410 by the same means by which the inserts 450 are mounted to the shell.

The mouth sound transmission insert 460 has a height H, defined within the opening 462, of at least 10 cm and a width W, perpendicular to the height H, defined within the opening 462 of at least 5 cm. In particular, the width W provides a suitable area for the sound waves generated by the wearer to pass through the hood 400.

Inserts 450 and 460 are formed of material that is relatively permeable to the transmission of sound waves. In one embodiment, inserts 450 and 460 are formed from a meltblown nonwoven material such as polypropylene. The material from which the inserts 450 and 460 is formed is also selected so as to form a barrier that would prevent the penetration of liquid state contaminates through the hood.

Figure 13:
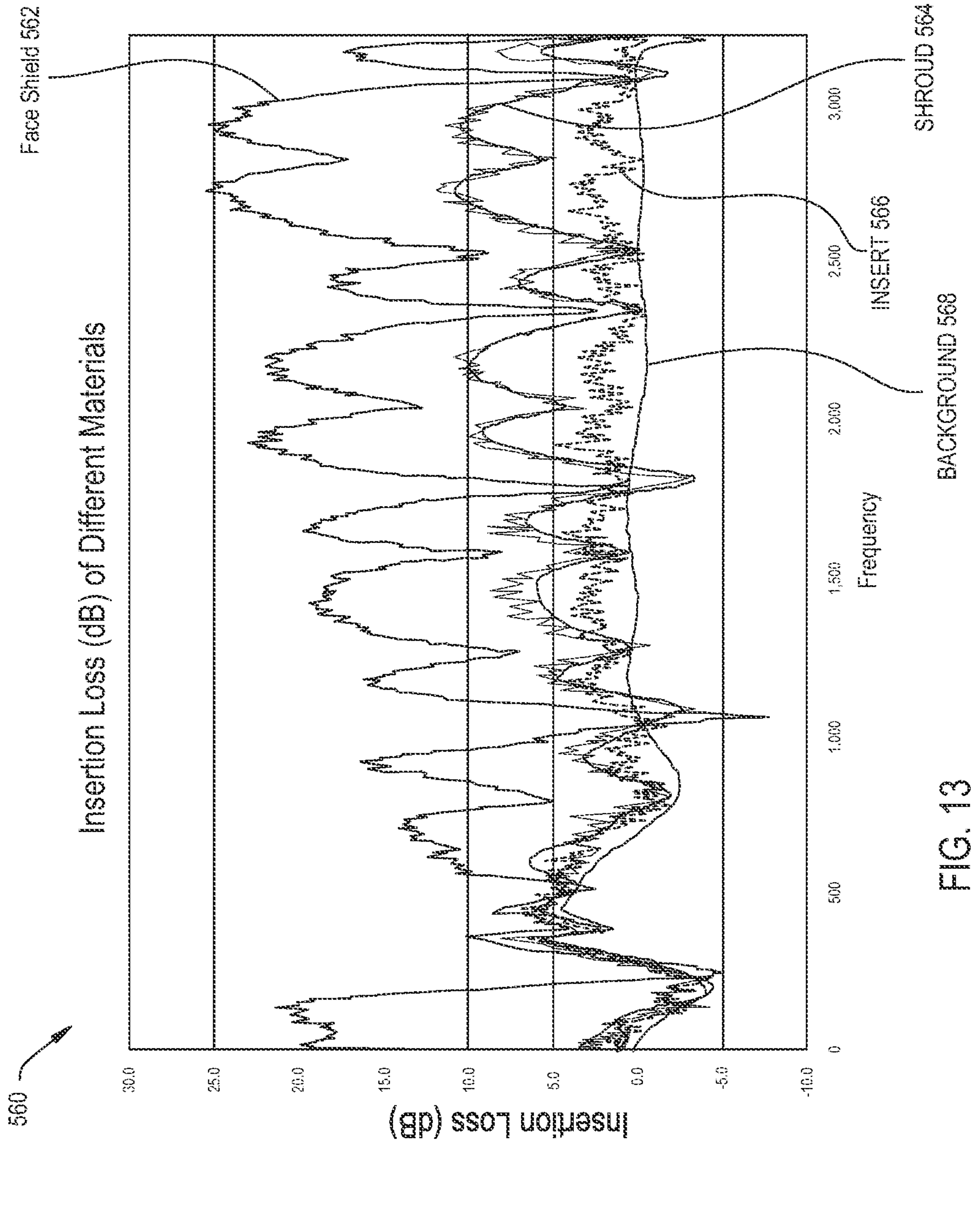
FIG. 13 is a graph of insertion loss versus frequency for several materials used in the fabrication of the hood.

FIG. 13 illustrates a graph 560 of sound insertion loss versus frequency for several different materials used in hood 400. Graph 560 compares the sound transmission of the different materials used in hood 400. The frequency range for human speech (i.e. the frequencies heard by the ear) is defined as between 85 to 3400 Hertz. Graph 560 illustrates the insertion loss in decibels (dB) over the frequency range of 0 to 3500 Hertz. Graph 560 illustrates actual sound loss measurements through the specific materials tested. The insertion losses shown in FIG. 13 were generated using the ASTM Test Method No. WK5285.

Graph 560 includes a face shield insertion loss 562 corresponding to the material forming face shield 500 and a shell insertion loss 564 corresponding to the nonwoven laminate with a polyethylene film material that forms shell 410. Graph 560 also shows an insert insertion loss 566 corresponding to the meltblown nonwoven material that forms inserts 450 and insert 460 and a background baseline insertion loss 568.

Face shield 500 has a maximum insertion loss 562 of 25 dB over the tested frequency range. Shell 410 has a maximum insertion loss 564 of 12 dB over the tested frequency range. Ear sound transmission inserts 450 and mouth sound transmission insert 460 has a maximum insertion loss 566 of 6 dB over the tested frequency range.

The use of ear sound transmission inserts 450 and mouth sound transmission insert 460 causes an appreciable increase in the sound level transmitted through personal protection system 50 and hood 400. Ear sound transmission inserts 450 appreciably improve the hearing of the wearer and mouth sound transmission insert 460 appreciably improves the comprehension of speech spoken by the wearer of hood 400.

IV. Helmet With Ultraviolet Inspection Light

Figure 15:
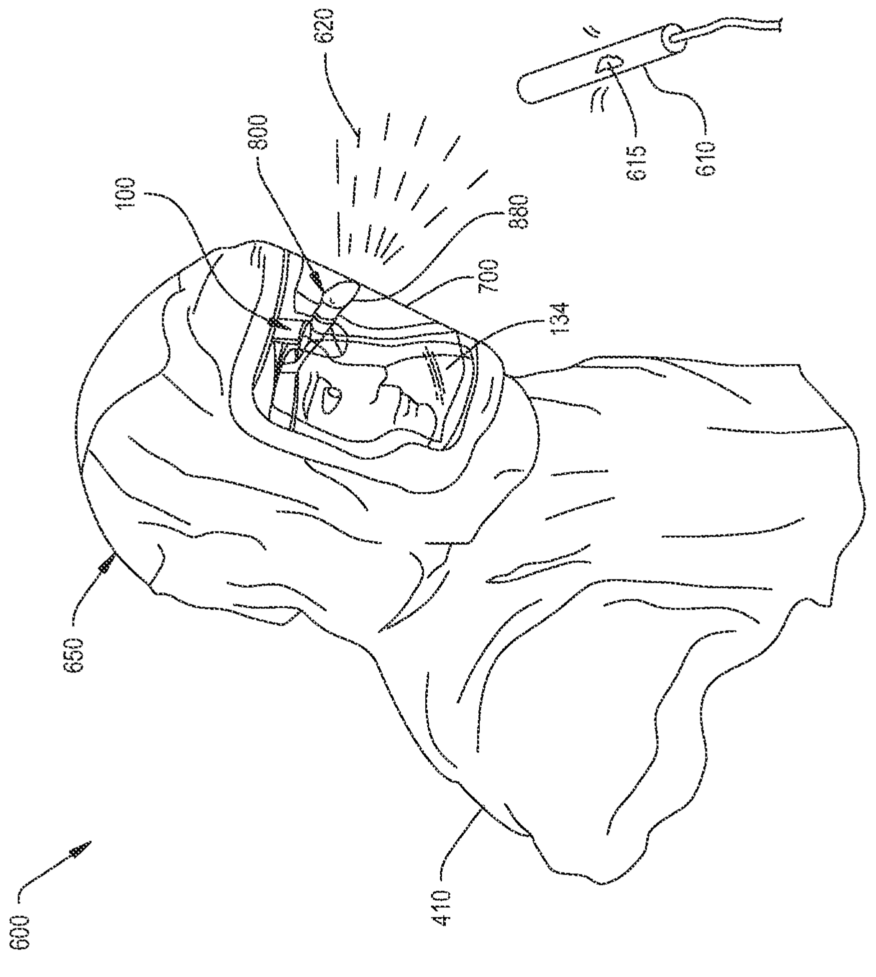
FIG. 15 is an overall perspective view of a personal protection system with a hood draped over a helmet that has an attached inspection light assembly in accordance with one embodiment of the present invention.

Referring to FIG. 15, a personal protection system 600 is illustrated. Personal protection system 600 includes a helmet 100 that is worn on the head of a user and a hood 650 with an integrated face shield 700 that is draped over the helmet 100. An ultraviolet inspection light assembly 800 is attached to the helmet 100 and located under the hood 650. The personal protection system 600 creates a sterile barrier between the wearer and an external environment.

The personal protection system 600 is useful in many medical environments. System 600 is particularly adapted for use in a sterile processing department to protect technicians from contact with pathogens and medical waste during cleaning processes for medical/surgical instruments 610. The ultraviolet inspection light assembly 800 is used during cleaning and inspection of medical/surgical instruments 610 to aid in the detection of adhered tissue 615 and body fluids are attached to the instruments 610. Because tissue and body fluids fluoresce under applied ultraviolet light 620, a technician using ultraviolet inspection light assembly 800 can readily detect the presence of adhered tissue and body fluids 615.

Figure 16:
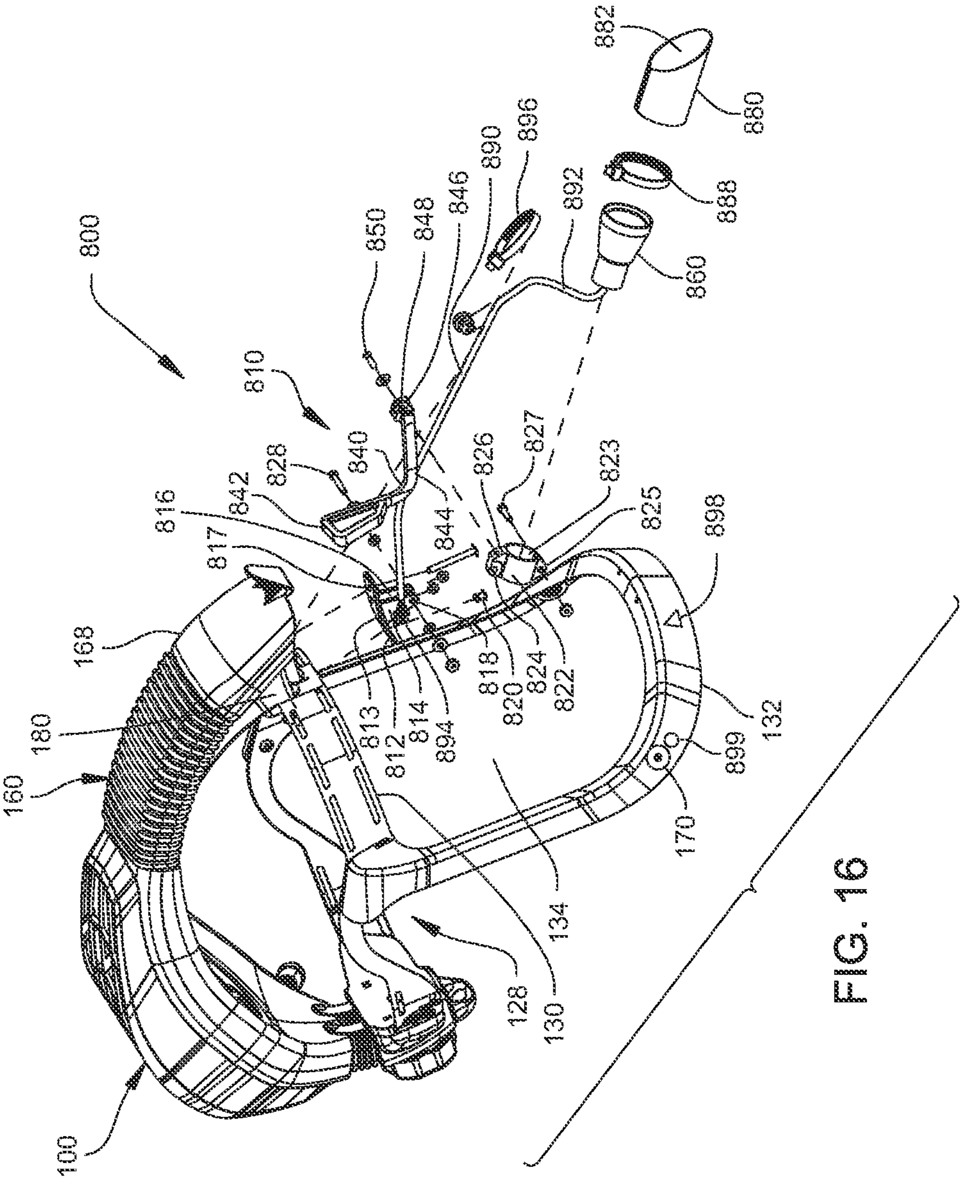
FIG. 16 is a front perspective view of the helmet of FIG. 15 with the inspection light assembly in an exploded state.
Figure 17:
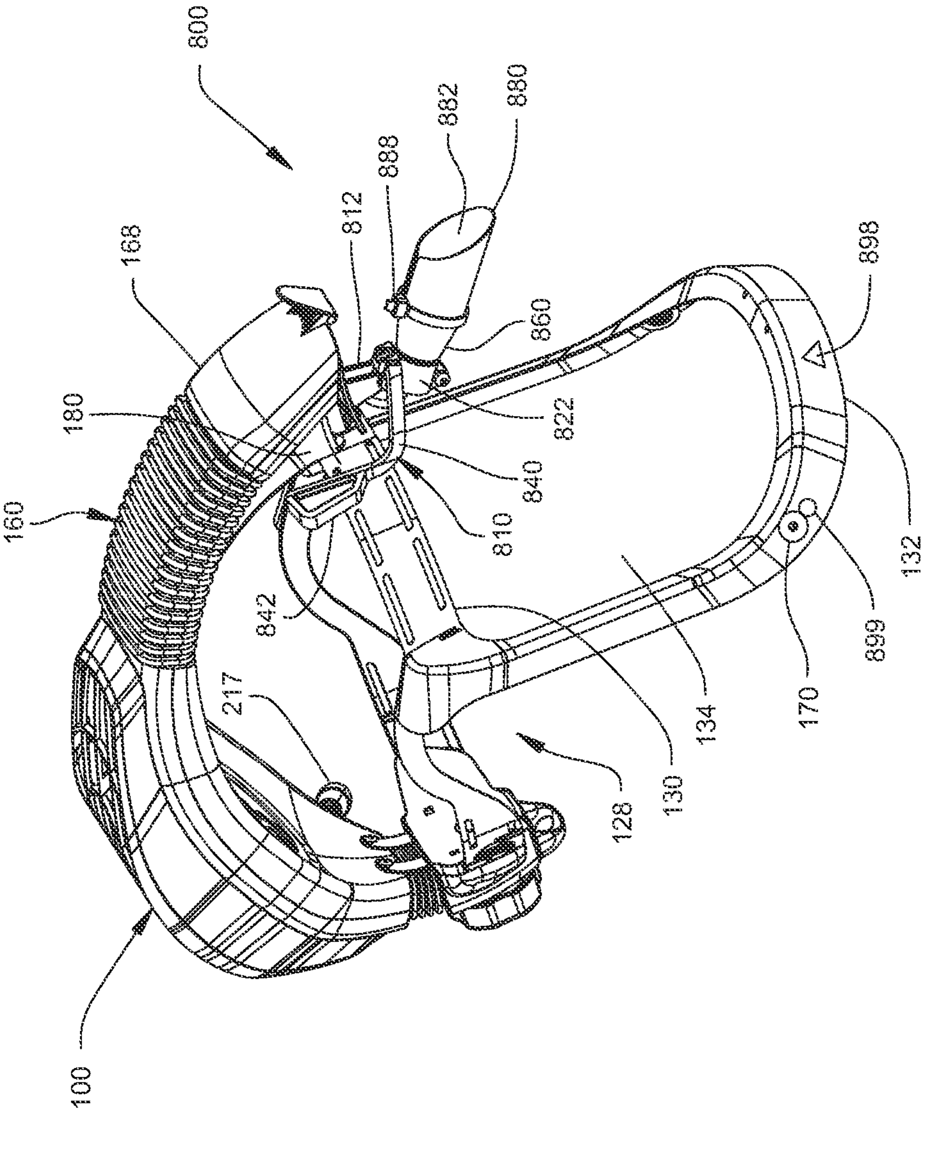
FIG. 17 is a front perspective view of the helmet of FIG. 15 with the inspection light assembly in an assembled state.
Figure 18:
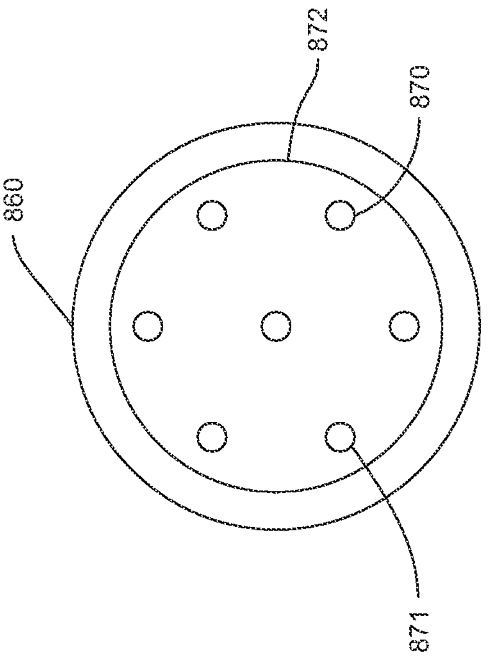
FIG. 18 is a front plan view of a light housing containing ultraviolet light emitting diodes.

Turning to FIGS. 16-18, details of personal protection system 600 will now be described. The ultraviolet inspection light assembly 800 is mounted to the front of helmet 100. Helmet 100 is the same as preciously described in FIGS. 2-8. Front nozzle assembly 160 further includes a pedestal 180 that is mounted between discharge nozzle 168 and head band 130. Pedestal 180 supports and spaces discharge nozzle 168 from the head of the wearer.

Ultraviolet inspection light assembly 800 comprises a light angle adjustment mechanism 810, a light housing 860, ultraviolet light emitting diodes 870 and a shell 880. Light angle adjustment mechanism 810 allows the user to change the direction of the beam of ultraviolet light 620 (FIG. 15) so it can be directed to a specific location.

Light angle adjustment mechanism 810 includes a bracket 812, a collar 822 and a control lever 840. Bracket 812 has a base 813. Two spaced apart parallel legs 814 are integrally formed with base 813 and extend perpendicularly away from base 813. A slot 816 is defined between legs 814. Holes 817 extend through base 813 and an aperture 818 is defined through the distal end of each of legs 814.

The bracket 812 is attached to pedestal 180. A base 813 is located adjacent to the lower side of pedestal 180. Fasteners 820 such as rivets extend through holes 817 and are received by openings (not shown) in pedestals 180 to hold bracket 812 to pedestal 180.

The collar 822 is circular in shape and has a center opening 823, an upper bore 824, a lower bore 825 and an angled bore 826. The center opening 823 of collar 822 fits over the proximal end of light housing 860 and is tightened around the proximal end of light housing 860 by fastener 827. Fastener 827 is a screw and nut. The screw extends through lower bore 825 and mates with the nut. The collar 822 is pivotally attached to legs 814. The upper end of collar 822 is received in the slot 816 between the legs 814. A shoulder bolt 828 extends through apertures 818 and upper bore 824 to pivotally retain collar 822 to bracket 812. One end of the shoulder bolt 828 is threaded and receives a nut.

The control lever 840 is attached to collar 822. The control lever 840 includes a triangular shaped handle 842. The handle 842 allows the user to manipulate the control lever 840. An arm 844 is connected to handle 842 and extends away from handle 842. Arm 844 terminates in a foot 846 that contains a through hole 848. A foot 846 is attached to the upper part of collar 822 by a fastener 850 that is received by angled bore 826.

When the hood 650 (FIG. 15) is placed over helmet 100, the handle 842 extends above the face shield 700 (FIG. 15) against an inside surface of shell 410. In this position, the user's hand, from outside of shell 410, can grasp and manipulate handle 842 through the shell to rotate collar 822 about the axis of pin 828. The rotation of collar 822 changes the angle of light housing 860 and the direction of the beam of ultraviolet light 620 allowing the light to be directed to a desired location.

The light housing 860 has one end that is cylindrical and another end that is in the shape of a cut off cone. A circuit board 872 is mounted within light housing 860. An ultraviolet light source, such as ultraviolet light emitting diodes (UVLEDS) 870, are mounted to circuit board 872. The UVLEDS 870 are mounted to circuit board 872 by suitable electronic assembly techniques such as soldering. Suitable ultraviolet light emitting diodes 870 are commercially available as model number LZ-100U600 from LED ENGIN Corporation having offices in San Jose, California.

Each ultraviolet light emitting diode 870 emits light in the ultraviolet frequency spectrum. Specifically, UVLED 870 emits ultraviolet (UV) light having wavelengths between 325 and 400 nanometers. The UV light in this frequency range causes tissue and body fluids to fluoresce. The fluorescence of these materials simplifies their visual detection.

In an optional embodiment, one or more of the UVLEDS 870 is replaced with a red visible light LED 871. The red visible light LED 841 is readily visible to others in the vicinity of ultraviolet light assembly 800. The red visible light LED 871 serves as a warning signal to other personnel and technicians that UVLEDS 870 are in operation.

An electrical cable 890 has one end 892 that is connected to circuit board 872 and another end that terminates in an electrical connector 894. The connector 894 mates with another connector portion on primary PCB 302 (FIG. 6). Cable 890 is routed in a hidden manner along and within portions of support structure 128. A cable clamp 896 retains a portion of cable 890 to support structure 128. The cable 890 supplies electrical power to UV light source 870 from primary PCB 302.

In one embodiment, a switch button 898 allows a user to selectively turn UVLEDS 870 on and off. Switch button 898 is mounted to the distal facing surface of chin bar 132 and connected to primary PCB 302. A user can depress button 898, through the material of shell 410 (FIG. 15), while wearing hood 650 (FIG. 15). In another embodiment, primary PCB 302 contains a timer circuit that turns off UVLEDS 870 after a pre-determined inspection time period.

Figure 19:
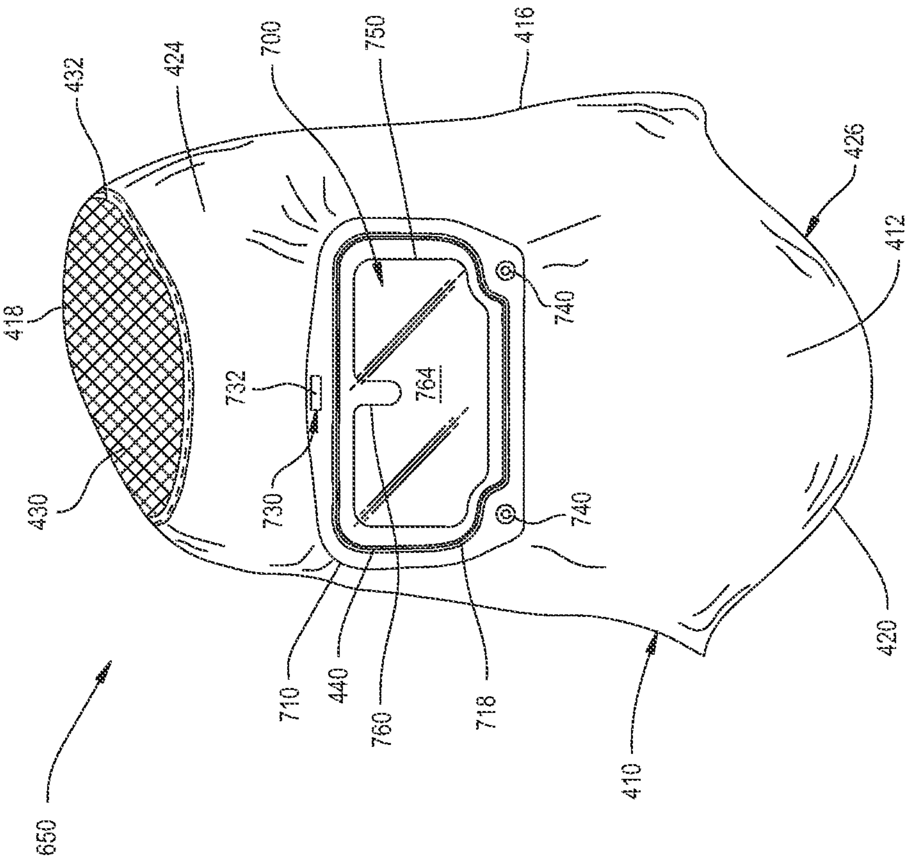
FIG. 19 is a rear view of the face shield of FIG. 15 with the hood turned inside out illustrating the face shield lens system in accordance with one embodiment of the present invention.
Figure 20A:
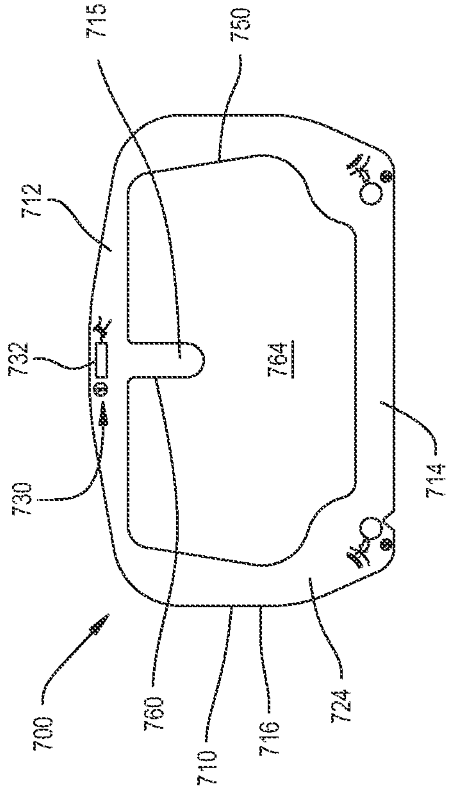
FIG. 20A is a rear view of the face shield lens system of FIG. 19.
Figure 20C:
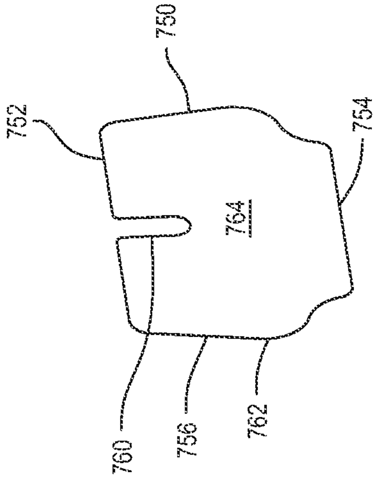
FIG. 20C is a rear perspective view of the UV blocking lens.
Figure 20B:
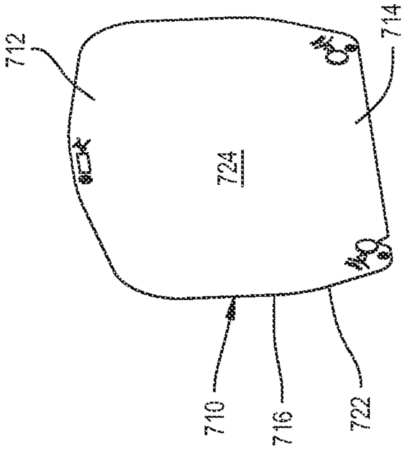
FIG. 20B is a rear perspective view of the UV transmission lens.

In an additional embodiment, helmet 100 contains a Hall Effect sensor 899 that senses the presence of hood 650 when hood 650 is being worn. Hall Effect sensor 899 is mounted to the distal facing surface of chin bar 132 adjacent to lower mounting device 170. In this example, lower mounting element 740 (FIG. 19) is a magnet and lower mounting device 170 is a material attracted to magnets such as steel. Hall Effect sensor 899 is connected to and in communication with primary PCB 302. The primary PCB 302 includes a control circuit that only allows UVLEDS 870 to be turned on when a signal is received from Hall Effect sensor 899 indicating the attachment of the lower mounting element 740 and that hood 650 is being worn.

A slanted shell 880 encircles the outlet end of light housing 860. A ring clamp 888 is mounted around the outer circumference of shell 880 and tightened around light housing 860. A light passage 882 extends through the center of shell 880. UV light from UVLEDS 870 passes though passage 882 and exits shell 880.

When an individual puts on system 600, the housing 860 that contains the LEDs is spaced inwardly from the hood face shield 700. Shell 880 extends from the light housing to against the inner surface of face shield 700 (FIG. 15). The shell 880 prevents UV light rays 620 from being reflected off the face shield 700 back toward the user. Shell 880 also collimates the emitted UV light rays from UVLEDS 870 toward the desired target.

The ultraviolet inspection light assembly 800 is positioned directly under the air discharge nozzle 168. By positioning as such, the air discharged from discharge nozzle 168 blows any warm air surrounding the light assembly 800 away from the light assembly. This reduces the amount of heated air adjacent the light assembly. Instead, the heated air is exhausted out of the hood 650. The removal of this heated air lessens the extent to which the heat generated by light assembly 800 warms the wearer of the personal protection system 600.

With reference to FIGS. 19 and 20A-C, details of the hood 650 and face shield 700 are shown. Hood 650 is similar to hood 400. For ease of illustration the inserts 450 and 460 are omitted.

The face shield 700 is flexible and transparent. As shown in FIG. 15, the face shield 700 is mounted to the distal facing front section 412 such that the face shield 700 covers the facial opening 134 of the helmet 100 after the individual dresses into system 600.

The face shield 700 includes a multi-layered lens. Face shield 700 includes two lenses, an outer ultraviolet (UV) passing lens 710 and an inner UV blocking lens 750. The passing lens 710 allows UV light to be transmitted or pass therethrough. In one embodiment, UV transmission lens 710 is molded or formed from a transparent plastic such as polycarbonate, acrylic or polyethylene terephthalate (PET). PET is also commonly called polyester. The passing lens 710 is generally rectangular in shape with rounded corners. Passing lens 710 includes a top portion 712, a bottom portion 714, an outer peripheral edge 716 and a sealing perimeter 718. Lens 710 also has a distal facing outer surface 722 and a proximal facing interior surface 724.

Blocking lens 750 prevents UV light from being transmitted therethrough. The blocking lens 750 is extruded and formed from transparent PET that contains UV light blocking additives. An example of one such UV blocking additive is Ultimate UV 390-1. Ultimate UV 390-1 is commercially available from Colormatrix Corporation of Cleveland, Ohio. Ultimate UV 390-1 is added and mixed with the PET material prior to extruding of UV blocking lens 750.

The outer facing surface of blocking lens 750 is attached to the inner facing surface of the passing lens 710 by suitable methods such as adhesives, heat staking or ultra-sonic welding.

Passing lens 710 is mounted over opening 440 slightly overlapping hood inside surface 424. Lens 710 can be sealed to the shell 410 by the same means by which lens 500 is sealed to the shell.

An upper mounting element 730 is disposed on the passing lens 710 along the top portion 712. The upper mounting element 730 is centered on lens 710 along the top portion 712. The upper mounting element 730 is a rectangular shaped aperture 732 defined through the lens 710. The upper mounting element 730 is configured for fastening to an upper mounting device 184 (FIG. 2) included on the helmet 100.

Two lower mounting elements 740 are disposed on the UV transmission lens 710 along the bottom portion 714 of inner surface 724 and facing in a proximal direction. The lower mounting elements 730 may be the same components found on lens 500.

The blocking lens 750 is generally rectangular in shape with rounded corners. Blocking lens 750 includes a top portion 752, a bottom portion 754, an outer peripheral edge 756 and a U-shaped opening or slot 760. UV blocking lens 750 further has a distal facing outer surface 762 and a proximal facing interior surface 764.

UV blocking lens 750 is slightly smaller in area than UV transmission lens 710. The distal facing outer surface 762 of UV blocking lens 750 is attached to the proximal inner facing surface 724 of outer UV transmission lens 710 by suitable methods such as adhesives or heat staking. The combination of inner UV blocking lens 750 and outer UV transmission lens 710 is transparent to visible light but, blocks UV light except through opening 760.

During use, the hood 650 is placed over the head of the user and attached to helmet 100. The upper mounting element 730 is fastened to upper mounting device 184 (FIG. 2) and the lower mounting elements 740 are attached to the corresponding lower mounting devices 170 (FIG. 2). The upper mounting element 730 centers the face shield 700 about UV inspection light assembly 800 (FIG. 15) such that shell 880 faces into U-shaped opening 760. In this position, UV light rays 620 (FIG. 15) emitted by UV inspection light assembly 800 pass through opening 760 and the section 715 of lens 710 disposed in the opening toward the desired target.

Blocking lens 750 reduces, if not eliminates, the transmission of UV light that may be reflected off surfaces outside of system 600 and that could enter the hood 410 through face shield 710. This reduces the likelihood that the UV light emitted by the system will reflect into the eyes of the individual. This results in a like reduction to which this reflection of ultra violet light could damage the eyes of the individual wearing the system.

The combination of outer UV transmission lens 710 and inner UV blocking lens 750 in face shield 700 advantageously allows a technician to inspect medical/surgical instruments 610 using UV light and at the same time be protected from the effects of any reflected UV light rays.

UV light is defined as having a wavelength of 100 to 400 nanometers. The preferred wavelengths for the inspection and detection of body tissue and fluids are in the range of 360 to 380 nanometers. In an optional embodiment, UV blocking lens 750 can be tinted with a coating or additive such that only UV wavelengths in the range of 360 to 380 nanometers are transmitted through UV blocking lens 750.

Figure 21:
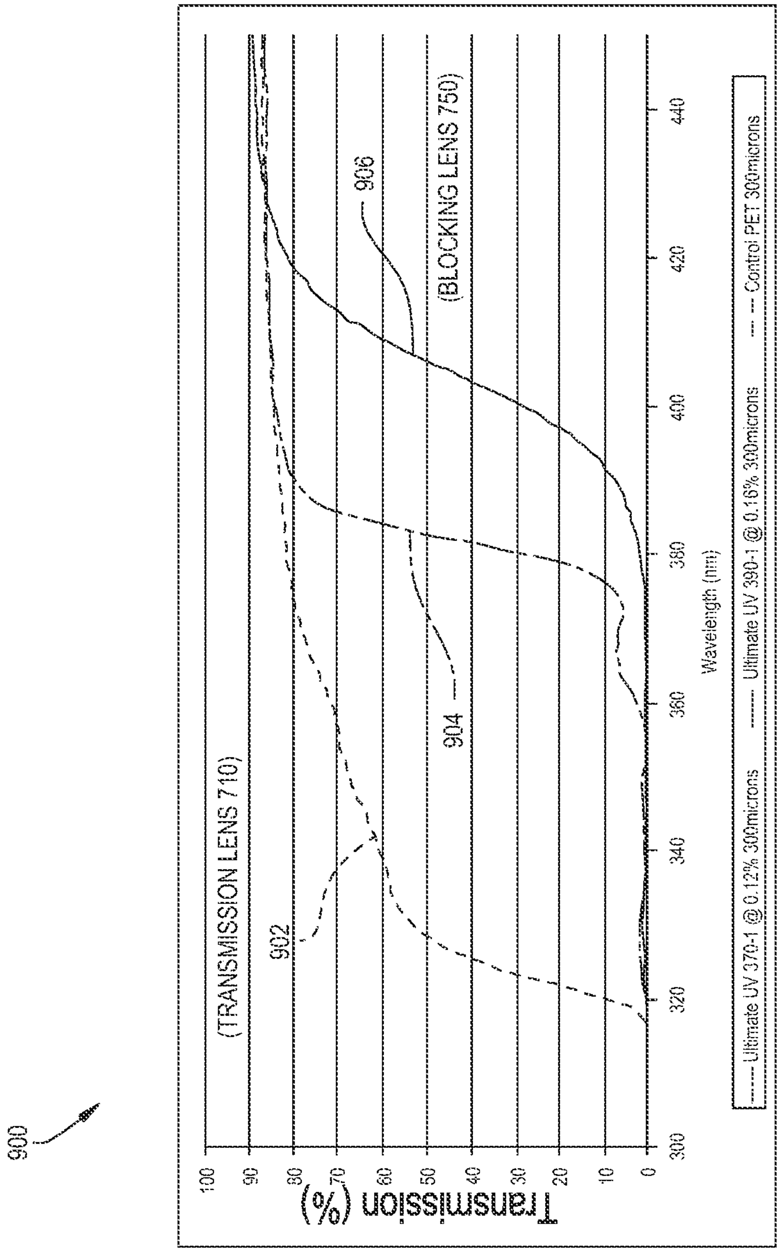
FIG. 21 is a graph of percent light transmission versus wavelength for several lens materials used in the face shield lens system.

FIG. 21 illustrates a graph 900 of percent light transmission versus wavelength for several different lens materials used in face shield 700. Graph 900 compares the light transmission characteristics of several polyester (PET) based materials using different additives. The visible frequency range for the human eye is between 390 to 710 nanometers. Graph 900 illustrates the light transmission in percent (%) over the wavelength range of 300 to 440 nanometers. Graph 560 illustrates actual light transmission measurements through the specific lens materials tested.

Graph 900 includes line 902 that corresponds to the percent light transmission for the PET material that forms the UV transmission lens 710. Line 904 corresponds to the percent light transmission for a PET lens containing the additive material identified as Ultimate UV370-1. Line 906 corresponds to the percent light transmission for a PET lens containing the additive material identified as Ultimate UV390-1 that forms the UV blocking lens 750.

Graph 900 shows that in the UV frequency range of 320 to 400 nanometers, the UV transmission lens 710 formed using PET without any additives, has only a slight reduction in the UV light transmitted. In comparison, the UV blocking lens 750 formed using PET containing the Ultimate UV390-1 additive almost entirely blocks any photonic energy (UV light) from being transmitted through blocking lens 750.

The above is directed to specific versions of the invention. The invention may have features different from what has been described.

For example not all features may be included in all versions of the invention. Thus, some versions of this invention may only include the described UV light/lights for rendering microorganisms innocuous. These versions of the invention will not include the shell with inserts that, in comparison to the surrounding fabric, only minimally distorts the transmission of sonic energy. Likewise the versions of the invention with the inserts designed to reduce the distortion of sonic energy may not be used with the versions of the invention that include components for emitting light in order to render microorganisms.

Further versions of the invention with inserts designed to minimize the distortion of the sonic energy through the shell may be located around only one of the mouth or ears.

Versions of the invention with lights that emit photonic energy used to inspect products may need not always be incorporated into other versions of the invention.

The arrangements of the components that form the inventions of this application may differ from what has been described. For example, in some versions of the invention the lights that emit photonic energy to render microorganism innocuous may be located in the one or more outlet ducts. Alternatively, these lights may be located both in the inlet duct and the one or more outlet ducts.

Similarly, the features of this invention may be incorporated into personal protection systems that have features different from what has been described. Thus not all personal protection systems of this invention have ducts capable of discharging air both in front of and behind the persons wearing the system.

Likewise, not all personal protection systems of this invention include helmets worn on the head. A personal protection system of this invention may include a fixed unit that is supported by the shoulders of the wearer. This fixed unit includes structural components that hold the hood above the head of the wearer and the ventilation unit that draws air into the hood.

The fastening members used to hold the hood to the support structure that holds the hood above the head of the individual wearing the system are likewise understood to be exemplary and not limiting. In alternative versions of the invention snaps, hook-and-loop fasteners and adhesives can be used as the components that hold the hood to the support structure.

The structure of the hood face shield that blocks the reflection of light back into the hood may also vary from what is described. In an alternative version of the invention, the section of the face shield that allows the transmission of the UV light through the face shield may be an insert into a larger component. This larger component is formed from material that blocks the transmission of the UV light. This larger component is formed with an opening to which the insert that is transparent to UV light is seated.

It should likewise be understood that the features of the various versions of the personal protection system of this invention can be combined as necessary.

Therefore, it is an object of the appended claims to cover all such variations and modifications that come within the true spirit and scope of this invention.

What is claimed is:

1. A personal protection system for use during a surgical procedure, the system comprising:

a helmet, the helmet comprising a light assembly;

a hood at least partially disposed over the helmet, the hood comprising:

a flexible shell defining an opening;

a transparent face shield disposed within the opening and attached to the shell, the transparent face shield comprising:

a first lens coupled to the shell, the first lens comprising a distal surface and an opposing proximal surface;

a second lens;

wherein the second lens defines a smaller area than the first lens; and wherein the second lens defines an opening aligned with the light assembly.

2. The system of claim 1, wherein the opening of the second lens defines a u-shaped opening configured to be aligned with the light assembly when the hood at least partially disposed over the helmet.

3. The system of claim 1, wherein the opening of the second lens defines a slot opening configured to be aligned with the light assembly when the hood at least partially disposed over the helmet.

4. The system of claim 1, wherein the second lens is attached to the first lens by ultra-sonic welding.

5. The system of claim 1, wherein the hood further comprises a mounting element configured to removably couple the transparent face shield to the helmet when the hood is at least partially disposed over the helmet.

6. The system of claim 5, wherein the helmet further comprises:

a chin bar; and a mounting device disposed on the chin bar and configured to removably couple with the mounting element of the hood.

7. The system of claim 5, wherein the mounting element is disposed on a lower portion of the first lens of the transparent face shield.

8. The system of claim 1, wherein the hood comprises an upper mounting element configured to center the transparent face shield relative to the light assembly such that the light emitted from the light assembly passes through the opening defined by the second lens.

9. The system of claim 1, wherein the second lens is attached to the first lens by one of an adhesive, heat staking or ultra-sonic welding.

10. The system of claim 1, wherein the first lens is an ultraviolet (UV) transmission lens configured to allow UV light to pass through the lens; and wherein the second lens is an ultraviolet (UV) blocking lens configured to prevent UV light from passing through the lens.

11. The system of claim 1, wherein the second lens is configured to reduce likelihood of light emitted by light assembly being reflected into an eye of a wearer of the hood.

12. A hood for use with a surgical helmet including a light assembly, the hood comprising:

a flexible shell defining a first opening;

a transparent face shield disposed within the first opening and attached to the shell, the transparent face shield comprising:

a first lens coupled to the shell, the first lens comprising a distal surface and an opposing proximal surface;

a second lens;

wherein the second lens defines a smaller area than the first lens; and wherein the second lens defines an opening configured to be aligned with the light assembly when the hood at least partially disposed over the helmet; and a mounting element for removably coupling the hood to the helmet.

13. The hood of claim 12, wherein the opening of the second lens defines a u-shaped opening.

14. The hood of claim 12, wherein the opening of the second lens defines a slot.

15. The hood of claim 12, wherein the transparent face shield comprises an upper mounting element configured to center the transparent face shield relative to the light assembly such that the light emitted from the light assembly passes through the opening defined by the second lens.

16. The hood of claim 12, wherein the second lens is attached to the first lens by one of an adhesive, heat staking or ultra-sonic welding.

17. The hood of claim 12, wherein the first lens is an ultraviolet (UV) transmission lens configured to allow UV light to pass through the lens; and wherein the second lens is an ultraviolet (UV) blocking lens configured to prevent UV light from passing through the lens.

18. The hood of claim 12, wherein the second lens is configured to reduce likelihood of light emitted by light assembly being reflected into a wearer's eyes.

19. The hood of claim 12, wherein the second lens is attached to the first lens by ultra-sonic welding.

20. A personal protection system for use during a surgical procedure, the system comprising:

a helmet including a mounting device;

a hood at least partially disposed over the helmet, the hood comprising:

a flexible shell defining an opening;

a transparent face shield disposed within the opening and attached to the shell, the transparent face shield comprising:

a first lens coupled to the shell, the first lens comprising a distal surface and an opposing proximal surface;

a second lens;

a mounting element configured to removably couple with the mounting device of the helmet when the hood is at least partially disposed over the helmet;

wherein the second lens is disposed over the distal surface of and coupled to the first lens by ultra-sonic welding; and wherein the second lens defines an opening that exposes a portion of the distal surface of the first lens.

* * * * *